US008296386B1

(12) United States Patent
Micalizzi, Jr.

(10) Patent No.: US 8,296,386 B1
(45) Date of Patent: Oct. 23, 2012

(54) METHOD AND SYSTEM FOR PROCESSING NETWORK PACKETS

(75) Inventor: Charles Micalizzi, Jr., Capistrano Beach, CA (US)

(73) Assignee: QLOGIC, Corporation, Aliso Viejo, CA (US)

(*) Notice: Subject to any disclaimer, the term of this patent is extended or adjusted under 35 U.S.C. 154(b) by 522 days.

(21) Appl. No.: 12/489,241

(22) Filed: Jun. 22, 2009

Related U.S. Application Data

(60) Provisional application No. 61/076,541, filed on Jun. 27, 2008.

(51) Int. Cl.
*G06F 15/167* (2006.01)

(52) U.S. Cl. ........ 709/212; 709/250; 709/223; 709/236; 709/248; 709/230; 370/254; 370/538; 370/431; 370/509; 370/463; 711/203

(58) Field of Classification Search .................. 709/212, 709/250, 223, 236, 248, 230; 370/254, 538, 370/431, 509, 463, 473; 711/203
See application file for complete search history.

(56) References Cited

U.S. PATENT DOCUMENTS

| 7,493,465 | B2* | 2/2009 | Susairaj et al. | 711/203 |
| 7,581,033 | B2* | 8/2009 | Ebersole et al. | 709/250 |
| 2002/0070941 | A1* | 6/2002 | Peterson et al. | 345/544 |
| 2005/0132077 | A1* | 6/2005 | Biran et al. | 709/230 |
| 2007/0016712 | A1* | 1/2007 | Chen et al. | 710/306 |
| 2007/0165672 | A1* | 7/2007 | Keels et al. | 370/474 |
| 2007/0260719 | A1* | 11/2007 | Pong | 709/223 |
| 2008/0056277 | A1* | 3/2008 | Sharma | 370/395.53 |

OTHER PUBLICATIONS

Shah, et al., RFC 5041, "Direct Data Placement Over Reliable Transports", *Network Working Group*, (Oct. 2007).

* cited by examiner

*Primary Examiner* — Thuong Nguyen
(74) *Attorney, Agent, or Firm* — Klein, O'Neill & Singh, LLP

(57) ABSTRACT

A method for writing information to a first memory location controlled by a first computing system from a second memory location controlled by a second computing system that interfaces with the first computing system via a network connection is provided.

24 Claims, 23 Drawing Sheets

EDDP RDMA Write Operation

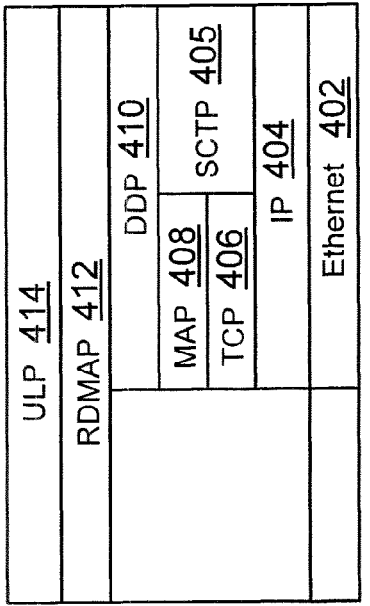
FIG. 4  RDMAP Layers
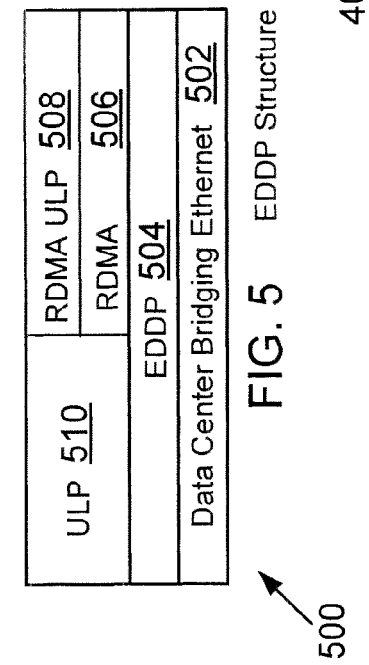
FIG. 5  EDDP Structure
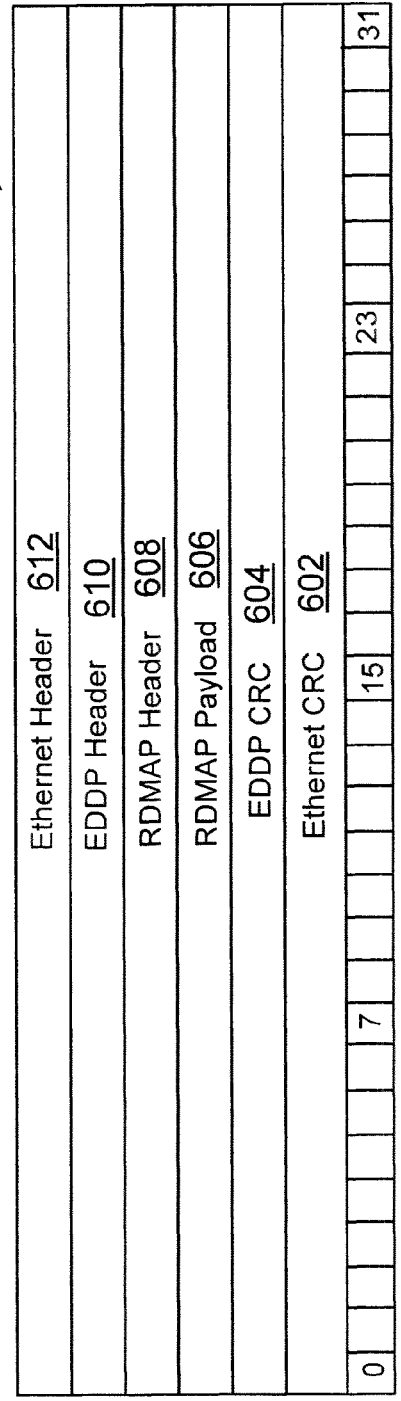
FIG. 6  Ethernet, EDDP, and RDMAP Header

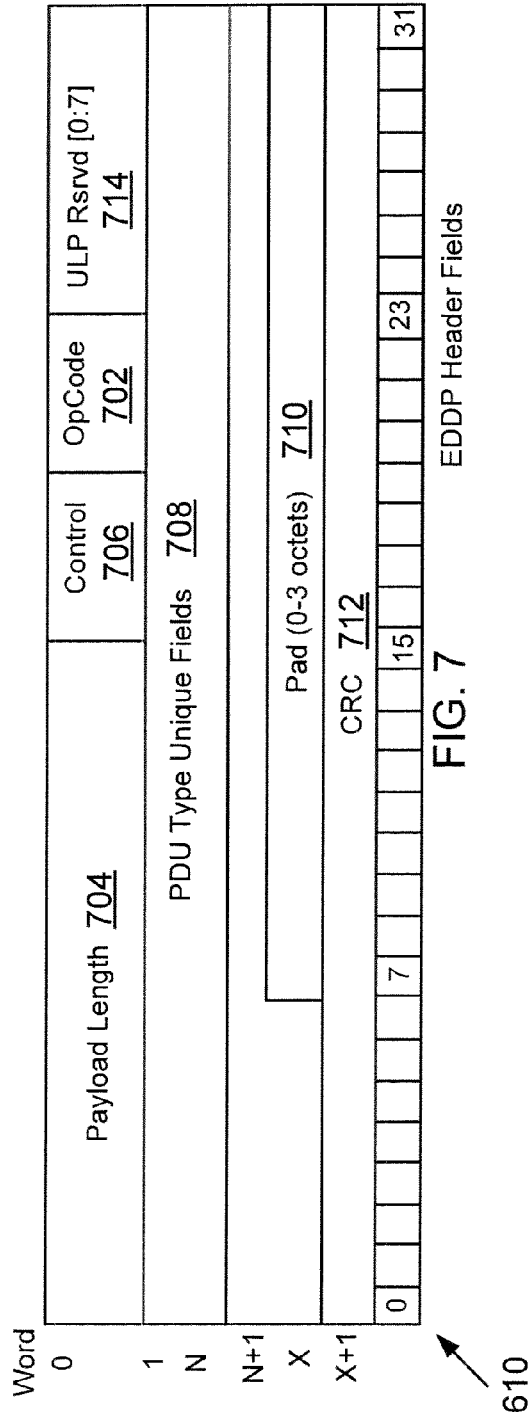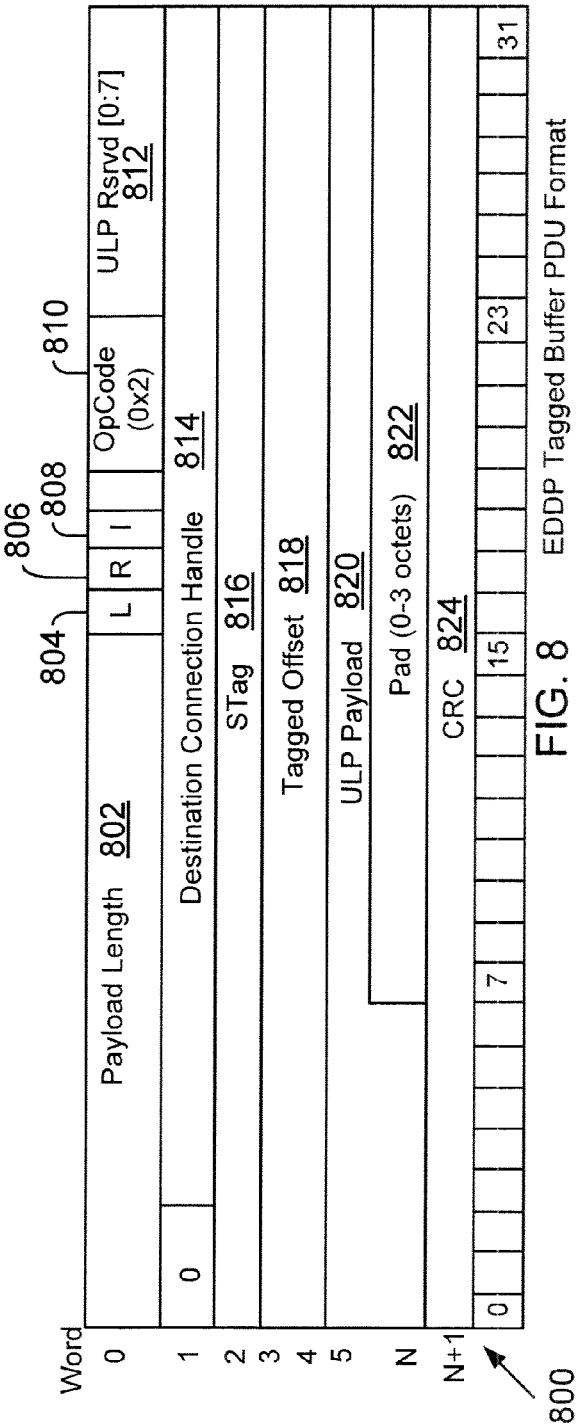

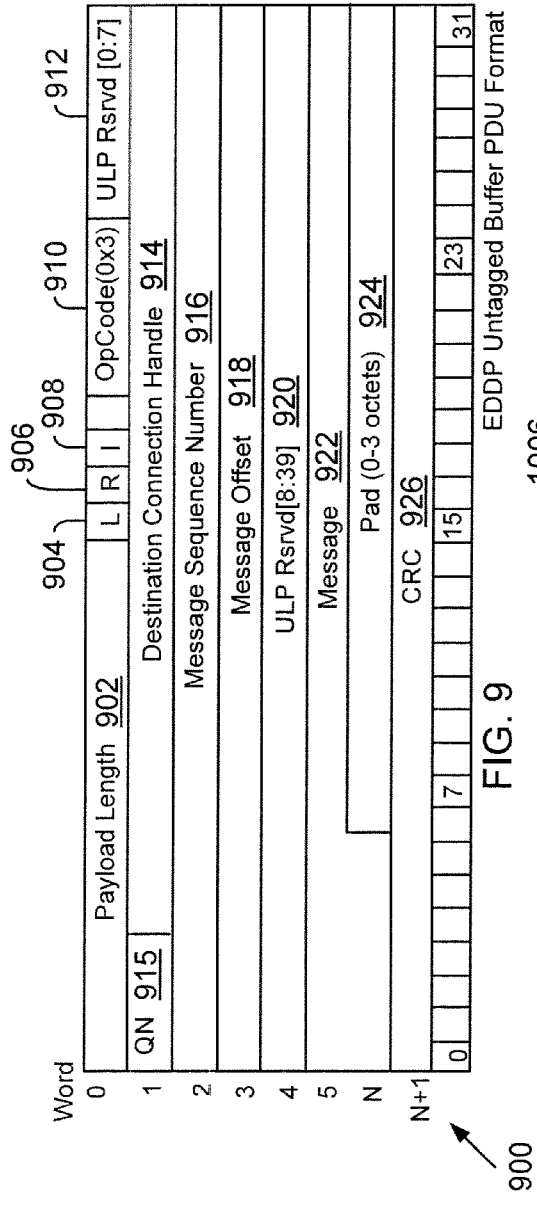
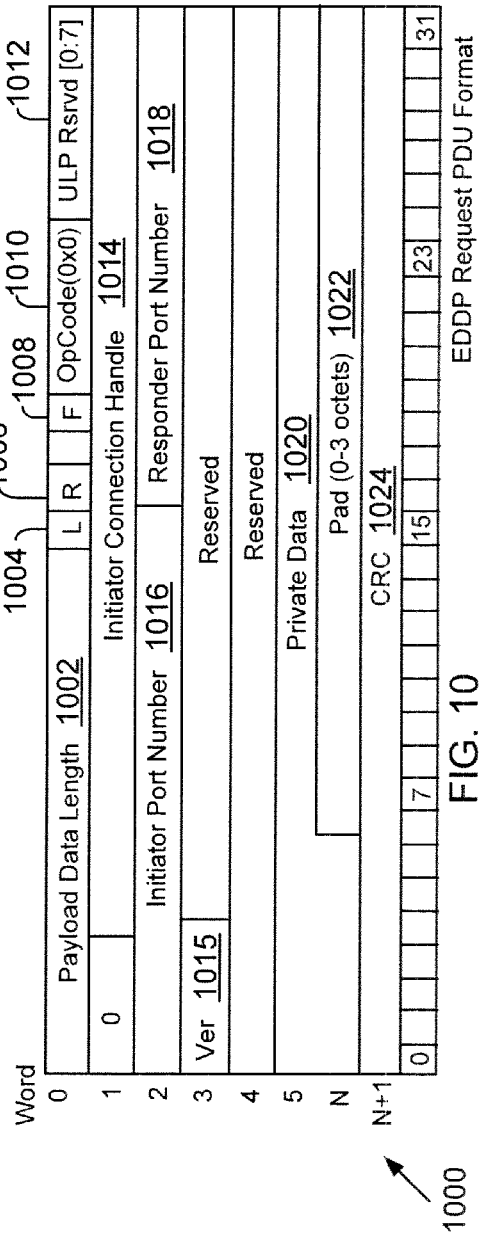
FIG. 9
FIG. 10

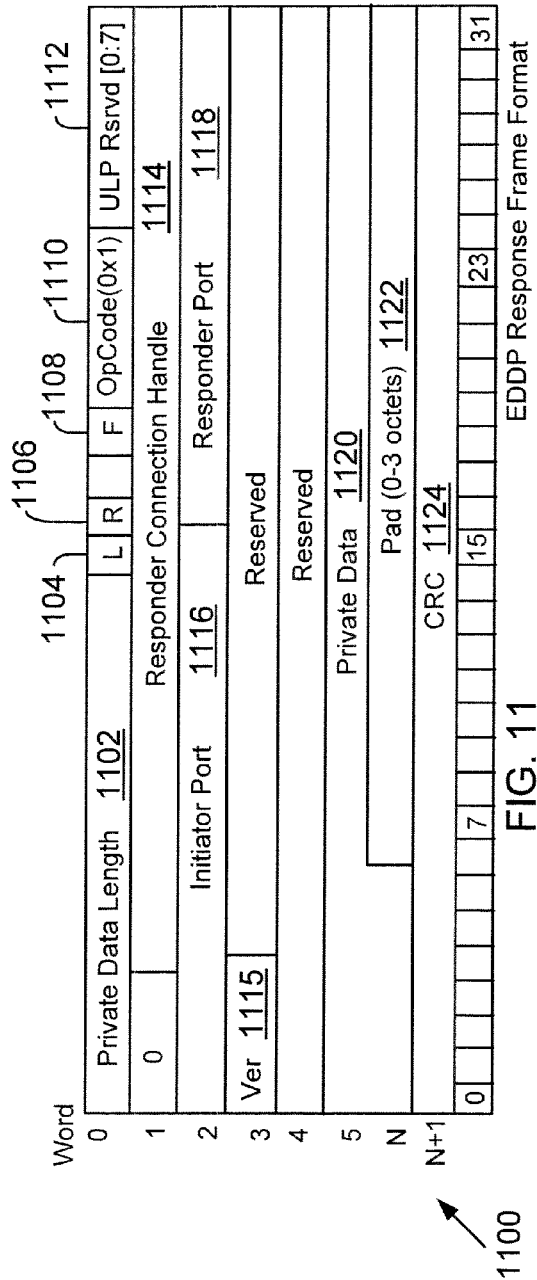
FIG. 11 EDDP Response Frame Format
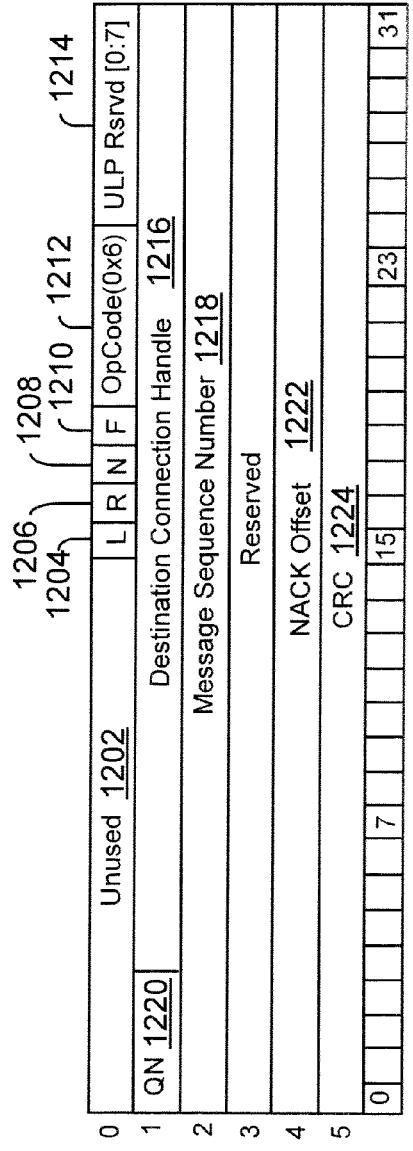
FIG. 12 EDDP Untagged Buffer Acknowledgement PDU Format EDDP RDMA Write Operation

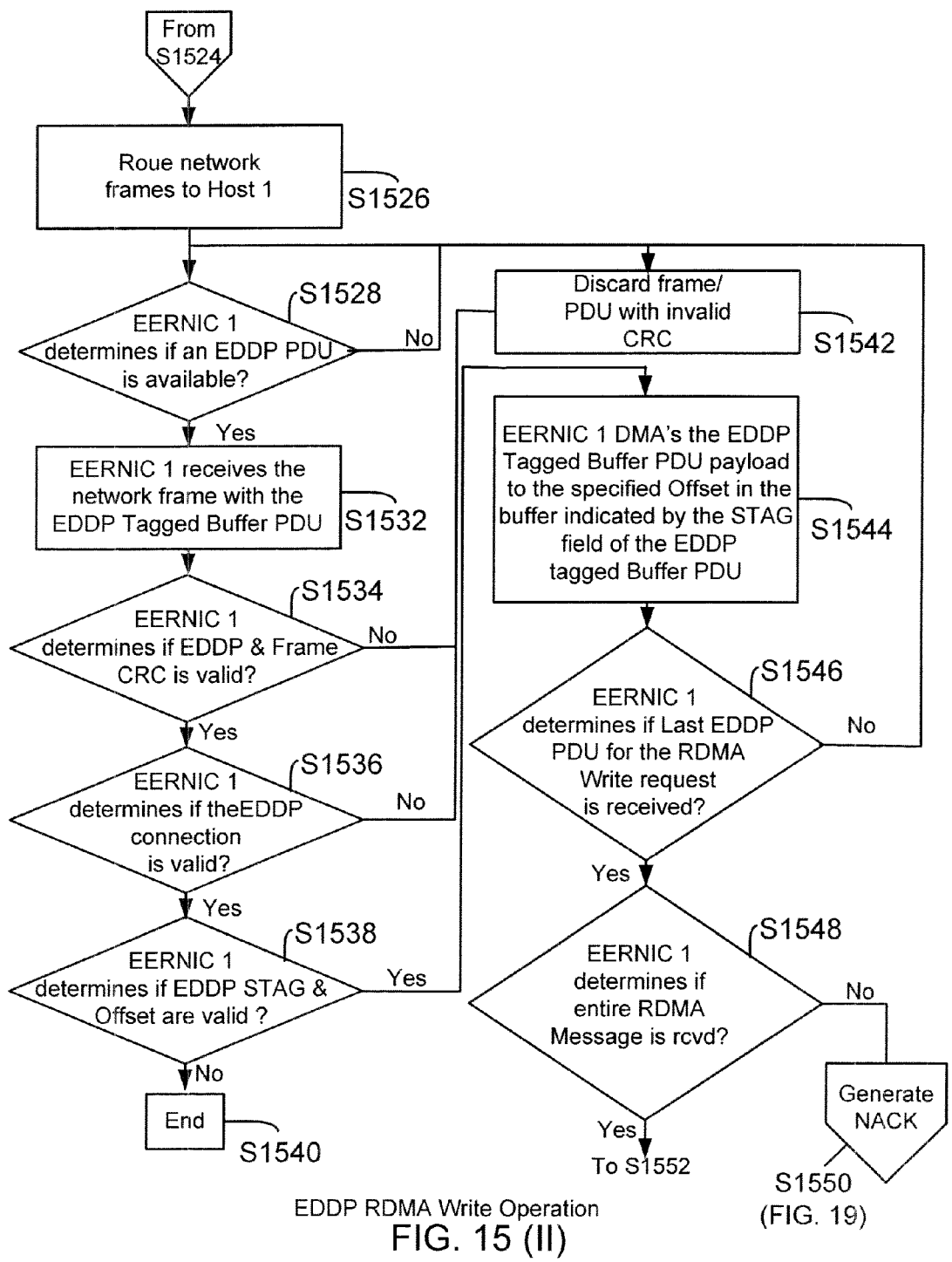
EDDP RDMA Write Operation
FIG. 15 (II)

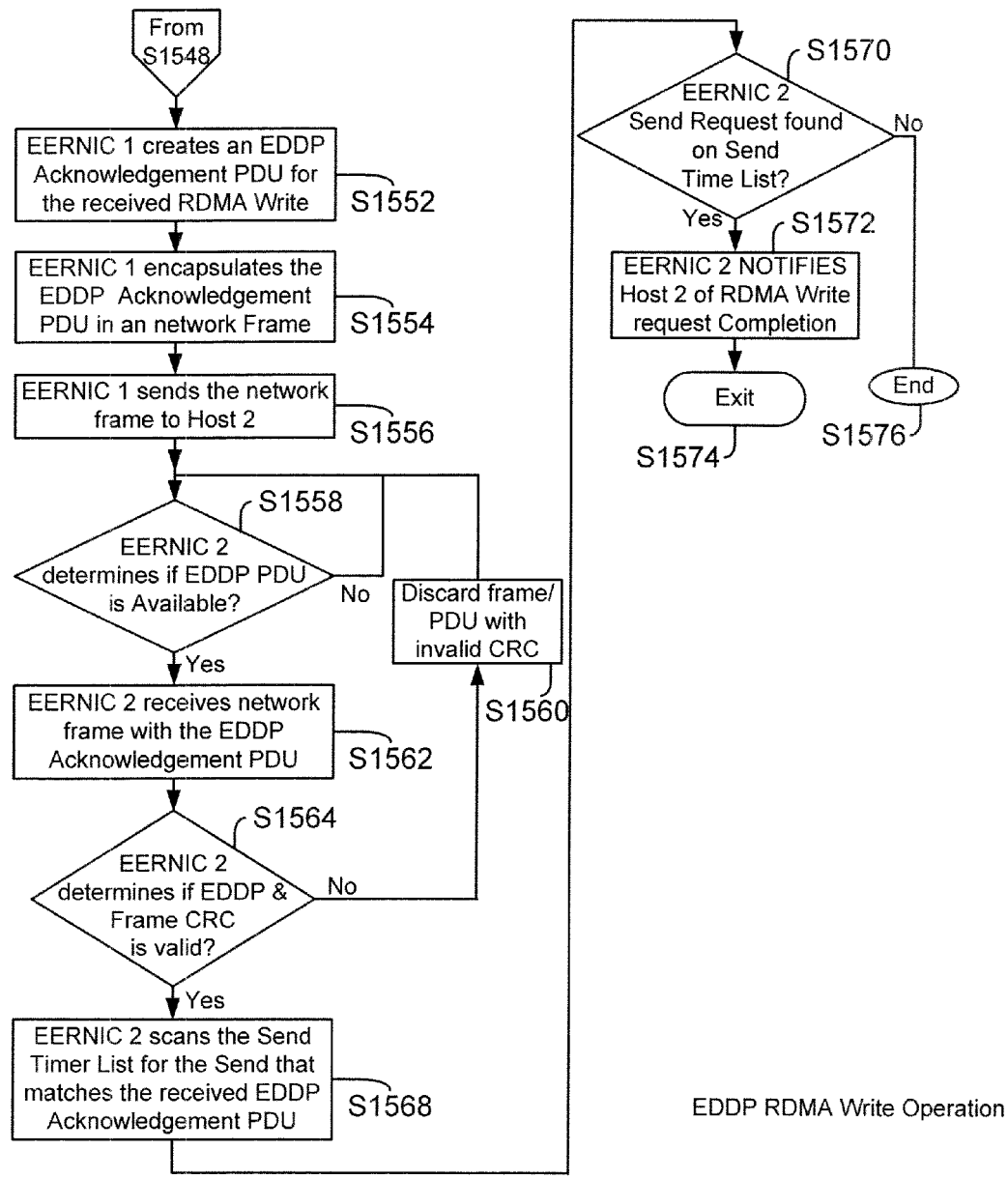
EDDP RDMA Write Operation
FIG. 15 (III)

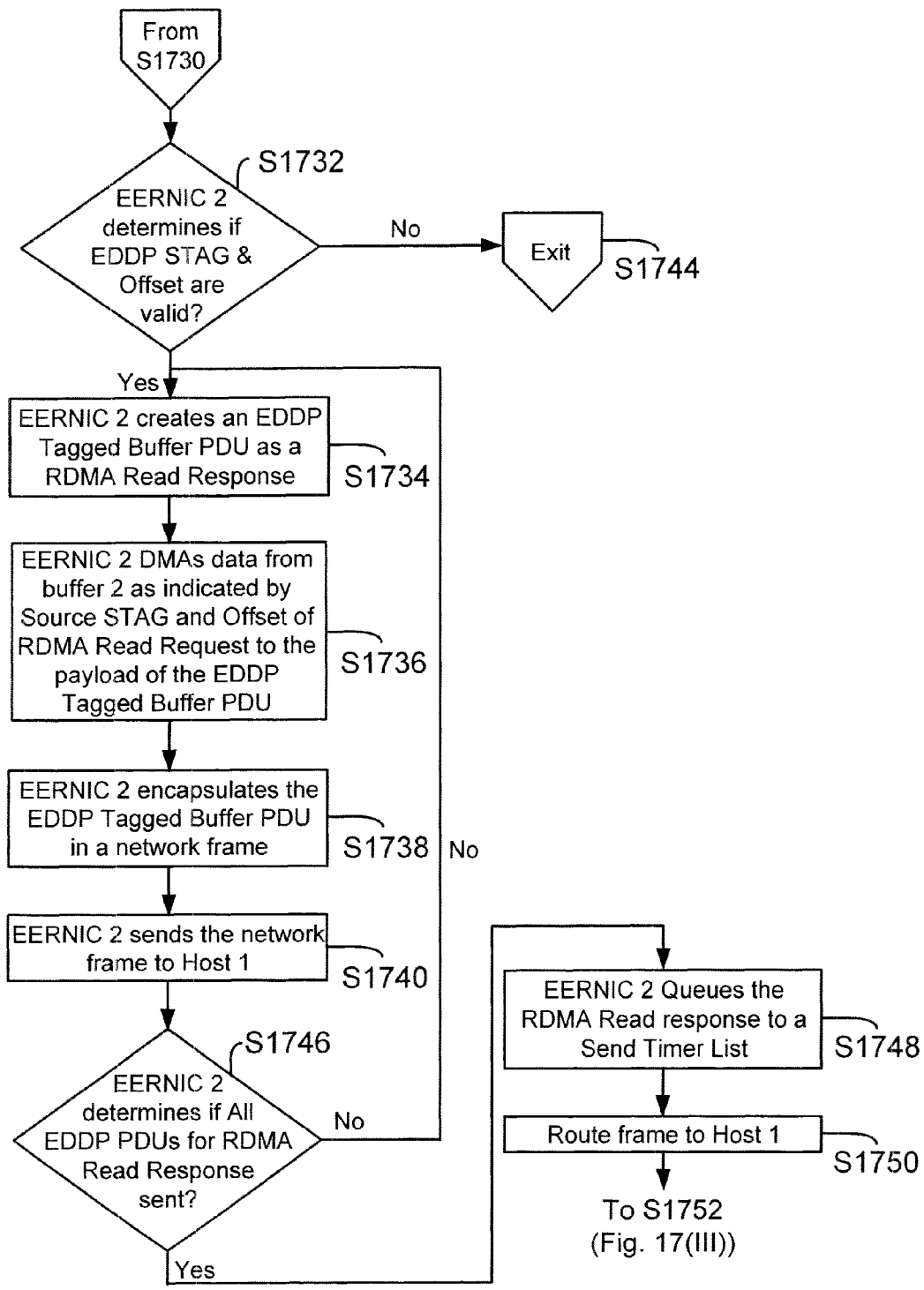
RDMA Read Operation FIG. 17 (II)

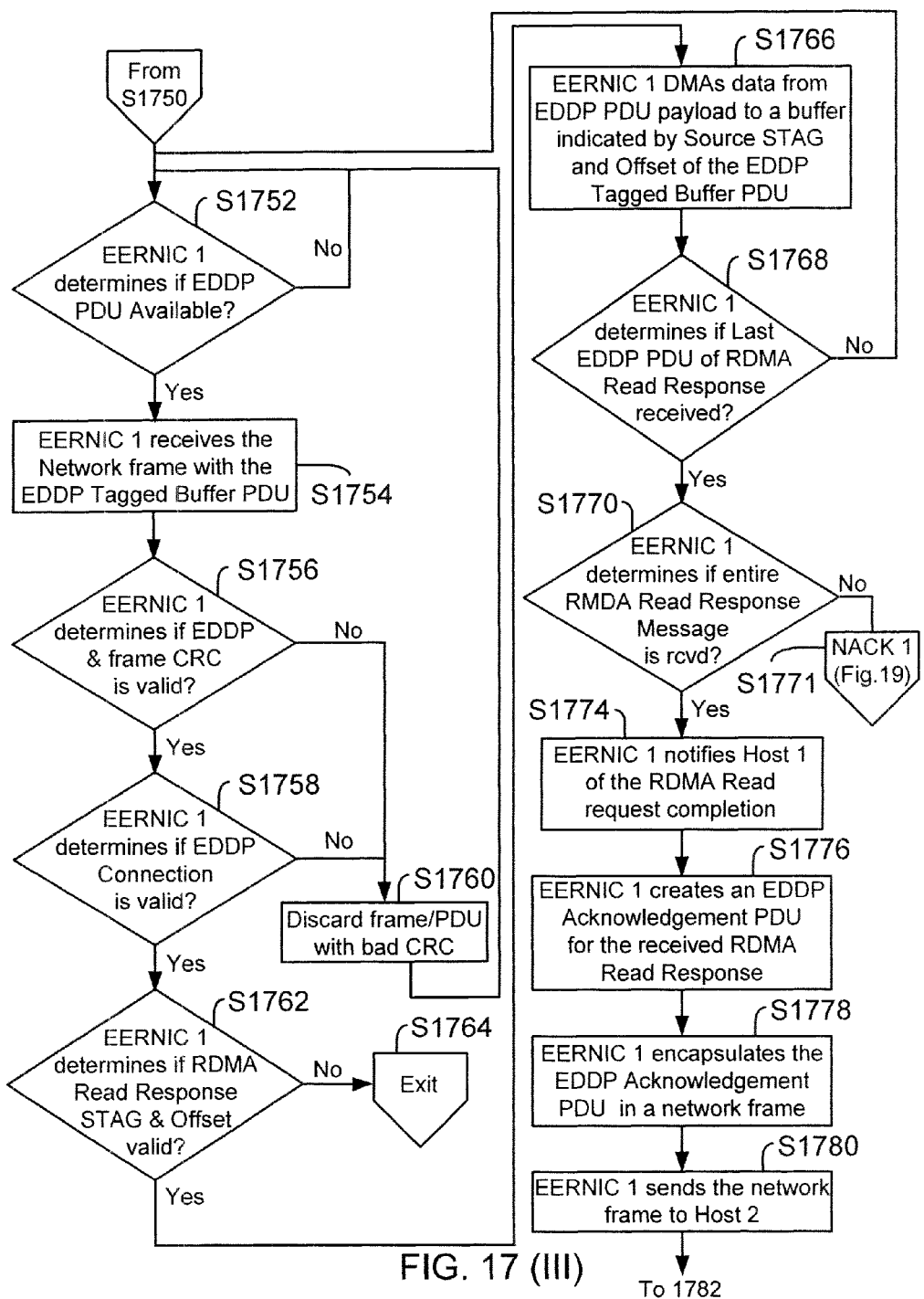
FIG. 17 (III)

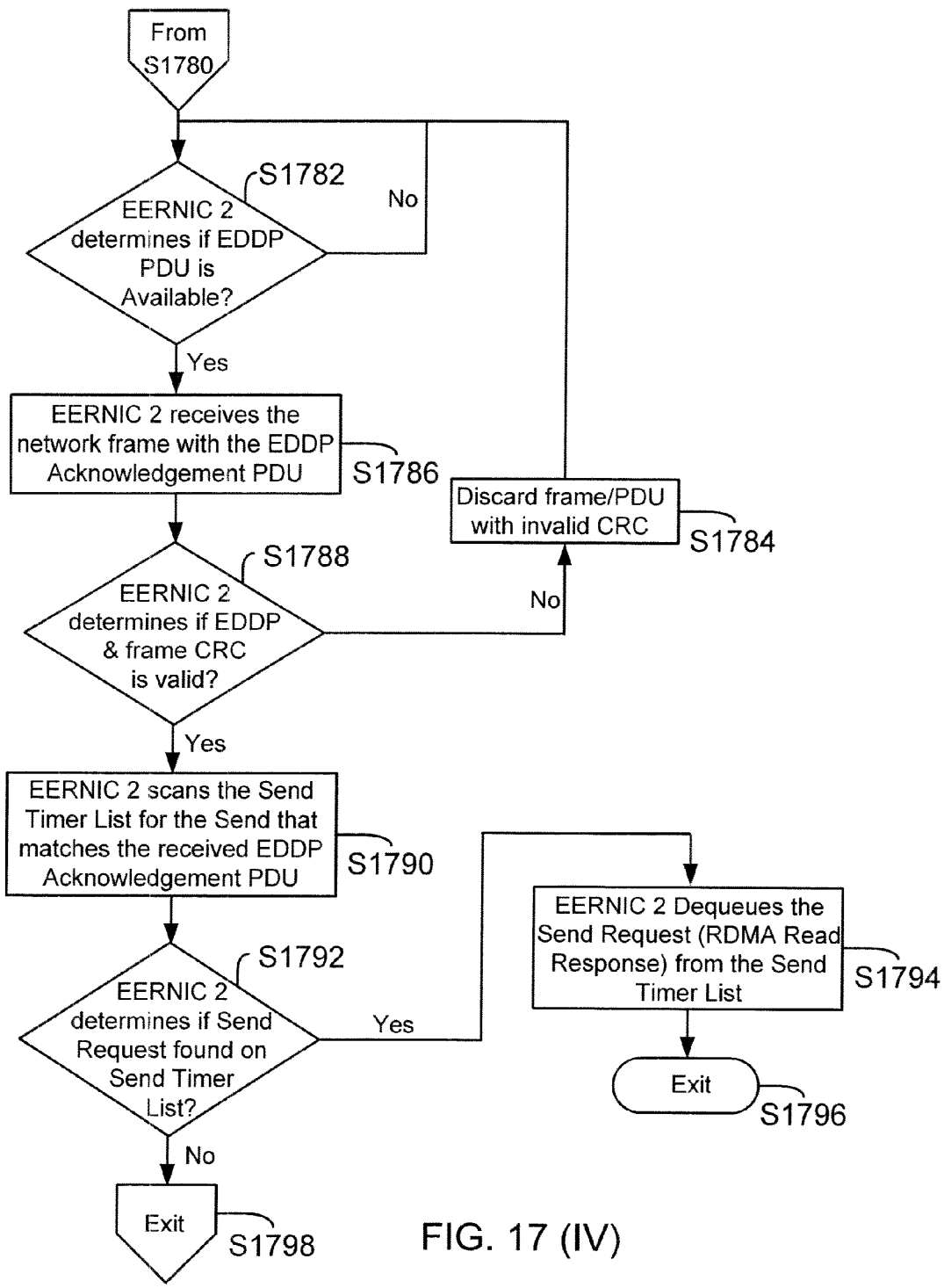
FIG. 17 (IV)

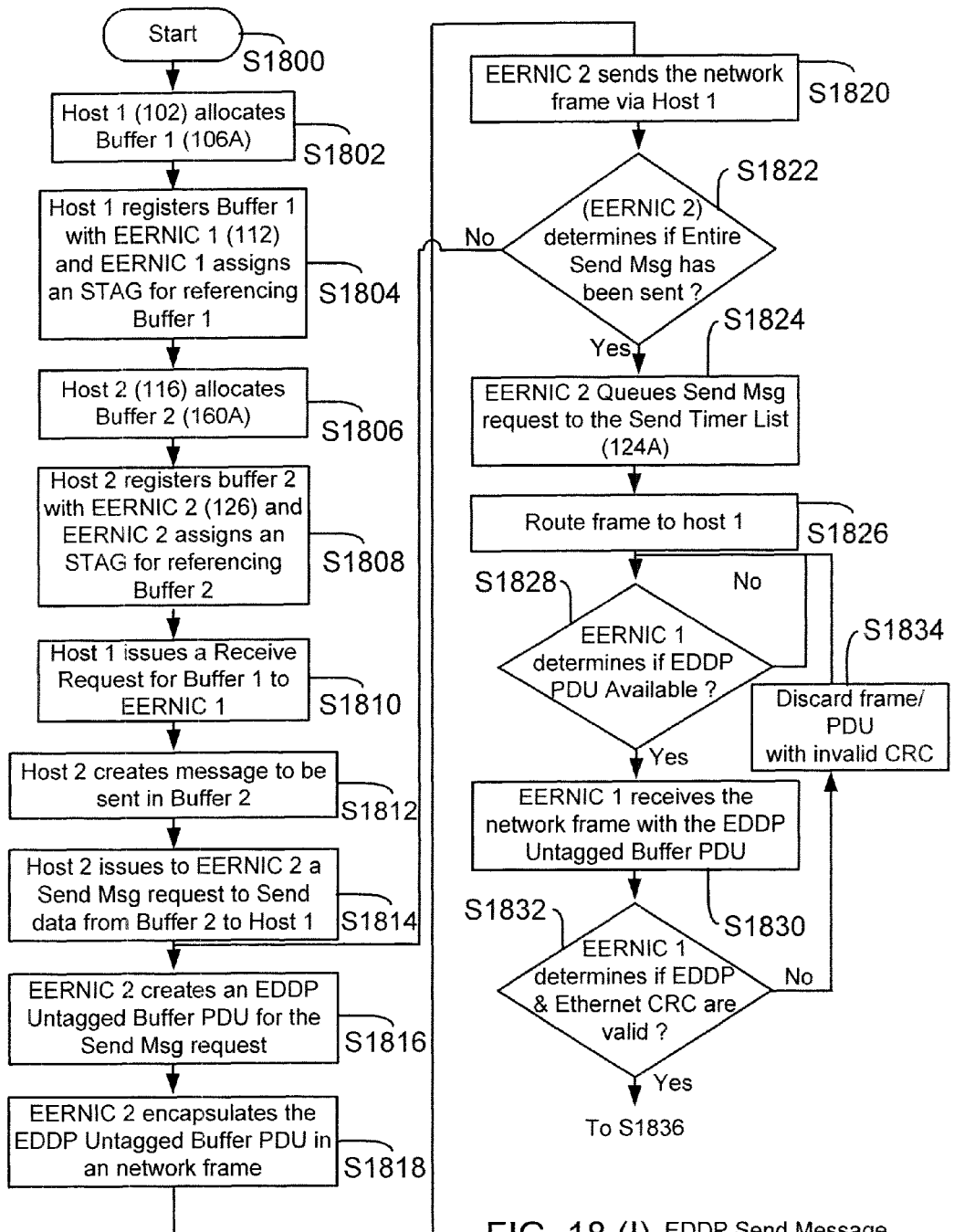
FIG. 18 (I) EDDP Send Message Opertaion

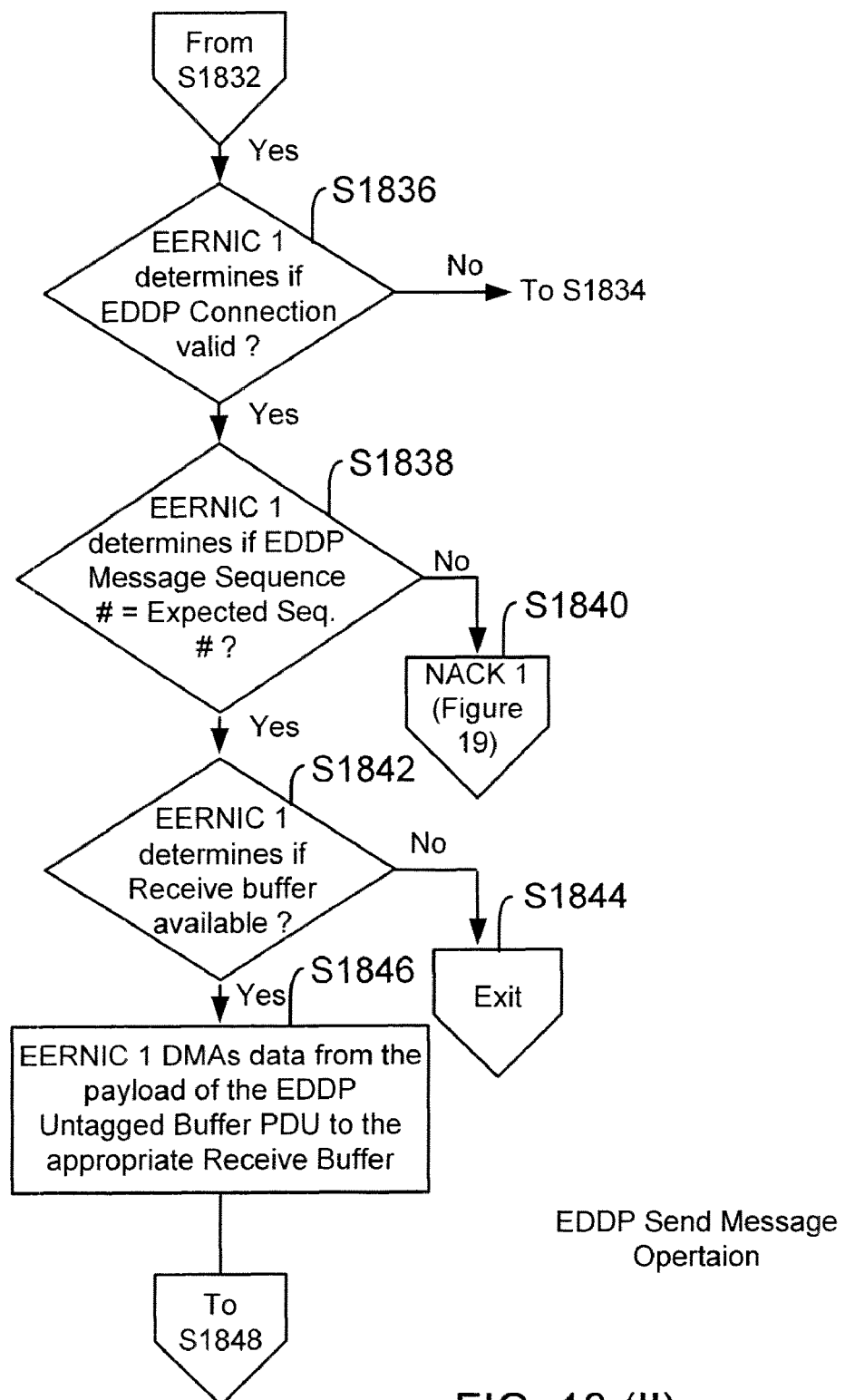
FIG. 18 (II)

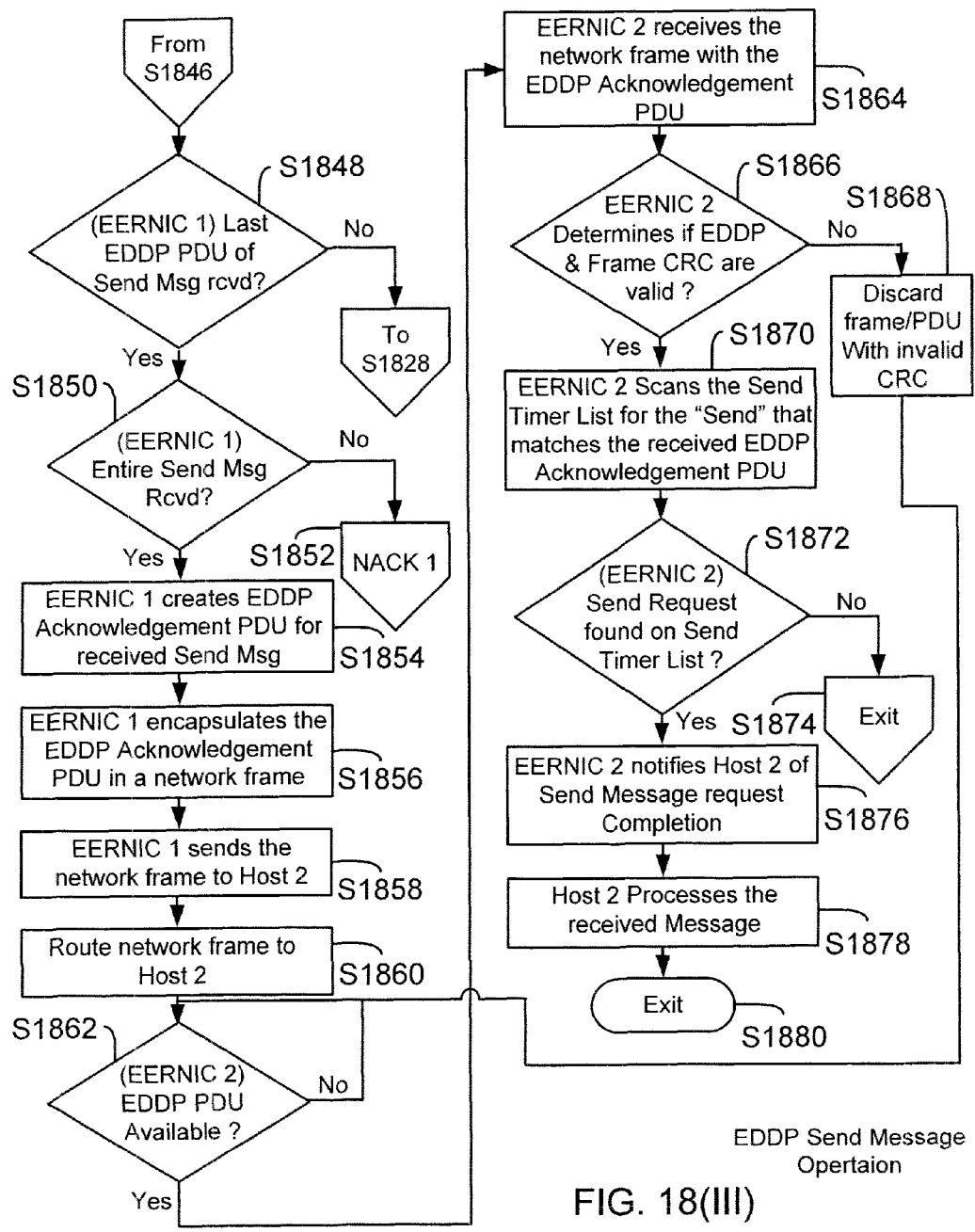
FIG. 18(III)
EDDP Send Message Opertaion

EDDP Negative Acknowledgment Operation

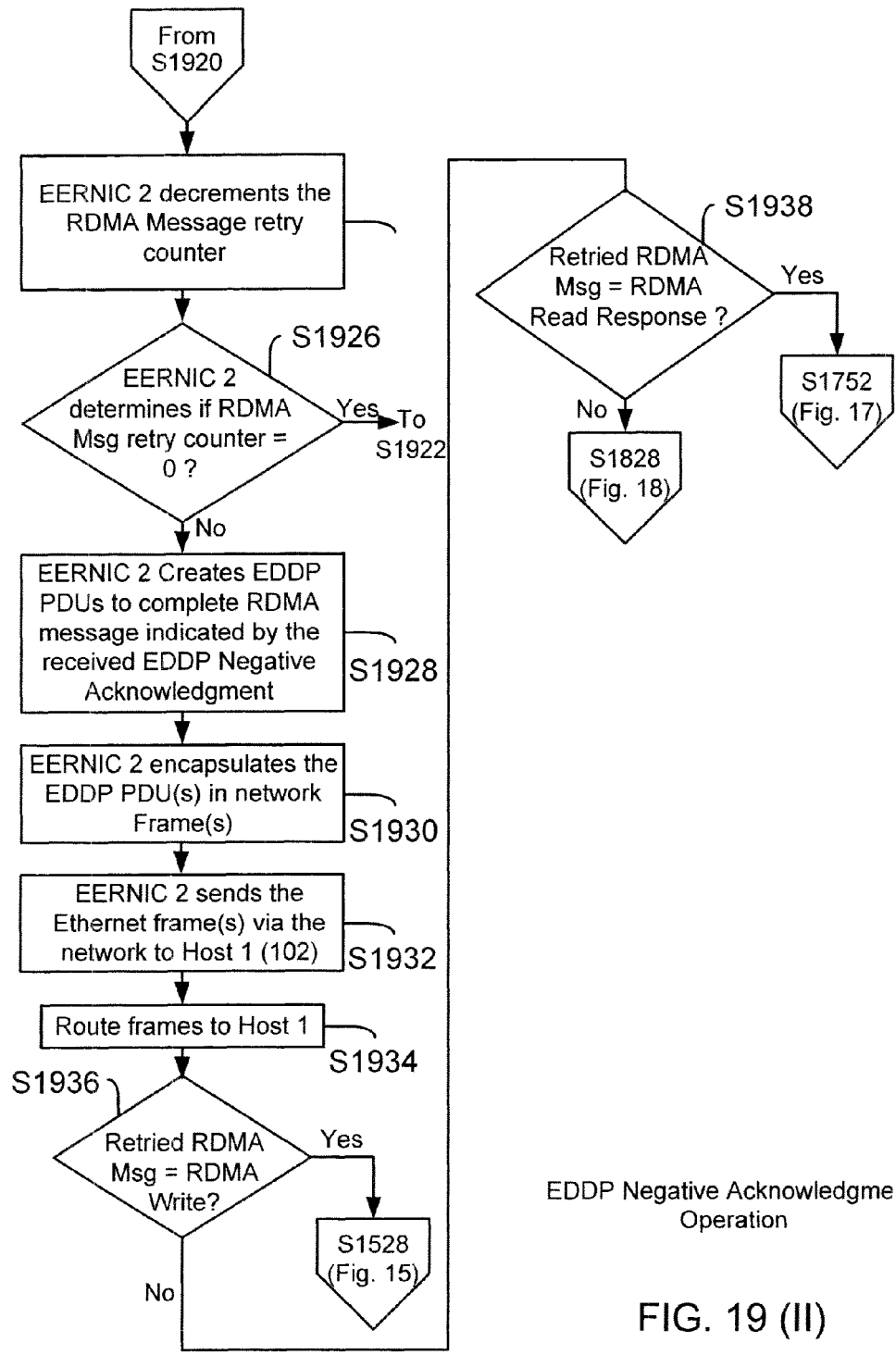
FIG. 19 (II)
EDDP Negative Acknowledgment Operation

METHOD AND SYSTEM FOR PROCESSING NETWORK PACKETS

CROSS-REFERENCE TO RELATED APPLICATIONS

This application is related to the U.S. Provisional application Ser. No. 61/076,541, entitled "Method and System for Processing Network Packets", filed on Jun. 27, 2008, the disclosure of which is incorporated herein in its entirety.

BACKGROUND

The present disclosure relates to network and storage systems.

Computer networks are commonly used to send and receive network information. Various protocols and standards are typically used to send and receive the network information. Often, information is sent and received as network packets, frames, protocol data units (PDUs) and other units. As electronic data continues to be stored and accessed via computer networks, it is desirable to have efficient and reliable network information delivery.

SUMMARY

In one embodiment, a method for writing information to a first memory location controlled by a first computing system from a second memory location controlled by a second computing system that interfaces with the first computing system via a network connection is provided. The method comprises: (a) registering the first memory location with a first adapter interfacing with the first computing system; (b) providing a first identifier for uniquely identifying the first memory location; wherein the first adapter provides the first identifier to the first computing system; (c) notifying the second computing system of the first memory location by using the first identifier with a write request for writing information from the second memory location directly to the first memory location; (d) registering the second memory location with a second adapter interfacing with the second computing system; (e) providing a second identifier for uniquely identifying the second memory location; wherein the second adapter provides the second identifier to the second computing system; (f) creating a tagged protocol data unit ("PDU") for transferring information directly from the second memory location to the first memory location; wherein the tagged PDU is created by the second adapter and includes an identifier for identifying the first computing system; the first identifier identifying the first memory location and an offset value that indicates a starting position in the first memory location where information from the second memory location is directly placed by the first adapter; (g) encapsulating the tagged PDU into a network frame; wherein the second adapter encapsulates the tagged PDU into the network frame; (h) sending the tagged PDU to the first adapter that places payload information of the tagged PDU directly to the first memory location; and (i) sending an acknowledgement PDU to the second computing system, if all messages for the write request have been received; wherein the first adapter sends the acknowledgement PDU to the second adapter via the network connection.

In another embodiment, a method for writing information to a first memory location controlled by a first computing system from a second memory location controlled by a second computing system that interfaces with the first computing system via a network connection is provided. The method comprises: (a) registering the first memory location with a first adapter interfacing with the first computing system; (b) providing a first identifier for uniquely identifying the first memory location; wherein the first adapter provides the first identifier to the first computing system; (c) notifying the second computing system of the first memory location by using the first identifier with a write request for writing information from the second memory location directly to the first memory location; (d) registering the second memory location with a second adapter interfacing with the second computing system; (e) providing a second identifier for uniquely identifying the second memory location; wherein the second adapter provides the second identifier to the second computing system; (f) creating a tagged protocol data unit ("PDU") for transferring information directly from the second memory location to the first memory location; wherein the tagged PDU is created by the second adapter and includes an identifier for identifying the first computing system; the first identifier identifying the first memory location and an offset value that indicates a starting position in the first memory location where information from the second memory location is directly placed by the first adapter; (g) encapsulating the tagged PDU into a network frame; wherein the second adapter encapsulates the tagged PDU into the network frame; (h) sending the tagged PDU to the first adapter that places payload information of the tagged PDU directly to the first memory location; wherein before transferring the payload to the first memory location, the first adapter verifies if a frame cyclic redundancy code ("CRC") and a PDU CRC are valid before processing the tagged PDU and if the frame CRC and PDU CRC are valid, the first adapter verifies if the network connection, the identifier for the first memory location and the offset are valid (i) sending an acknowledgement PDU to the second computing system, if all messages for the write request have been received; wherein the first adapter sends the acknowledgement PDU to the second adapter via the network connection; and if the first adapter determines that all messages regarding the write request have not been received, the first adapter sends a non-acknowledgement packet to the second computing system.

In yet another embodiment, a system for network communication is provided. The system comprises: a first computing system having a first memory location and a first adapter for communicating via a network connection with a second computing system having a second memory location and a second adapter; wherein information from the second memory location is written directly to the first memory location in response to a write request; wherein the first adapter is configured to register the first memory location, provide a first identifier to the first computing system for uniquely identifying the first memory location; and notify the second computing system of the first memory location using the first identifier; wherein the second adapter is configured to register the second memory location; provide a second identifier for uniquely identifying the second memory location; in response to the write request, create a tagged protocol data unit ("PDU) for transferring information directly from the second memory location to the first memory location; encapsulate the tagged PDU into a network frame; and send the tagged PDU to the first adapter; wherein the tagged PDU includes an identifier for identifying the first computing system; the first identifier identifying the first memory location and an offset value that indicates a starting position in the first memory location where information from the second memory location is directly placed by the first adapter; wherein before transferring a payload from the Tagged PDU to the first memory location, the first adapter verifies if a frame cyclic redundancy code ("CRC") and a PDU CRC are valid before processing the tagged PDU and if the frame CRC and PDU CRC are valid, the first adapter verifies if the network connection, the identifier for the first memory location and the offset are valid; and wherein the first adapter sends an acknowledgement PDU to the second computing system, if all messages for the write request have been received; and if the first adapter determines that all messages regarding the write request have not been received, the first adapter sends a non-acknowledgement packet to the second computing system.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of a preferred embodiment. In the drawings, the same components have the same reference numerals. The illustrated embodiment is intended to illustrate, but not to limit the disclosure. The drawings include the following Figures:

FIG. 4 shows a RDMA protocol layered architecture used according to one embodiment;

FIG. 5 shows a EDDP architecture, according to one embodiment;

FIG. 6 shows a layout of EDDP layered below RDMA and above DCB Ethernet, according to one embodiment;

FIG. 7 shows an example of EDDP header fields, according to one embodiment;

FIGS. 8-13 provide examples of some of the PDU formats, according to the adaptive embodiments of the present disclosure.

FIG. 18 shows a process flow diagram sending a message using EDDP, according to one embodiment;

DETAILED DESCRIPTION

To facilitate an understanding of the various embodiments, a top-level description of common network protocols/standards and the general architecture/operation of a host system will be described. The specific architecture and operation of the various embodiments will then be described with reference to the general architecture.

Figure 1:
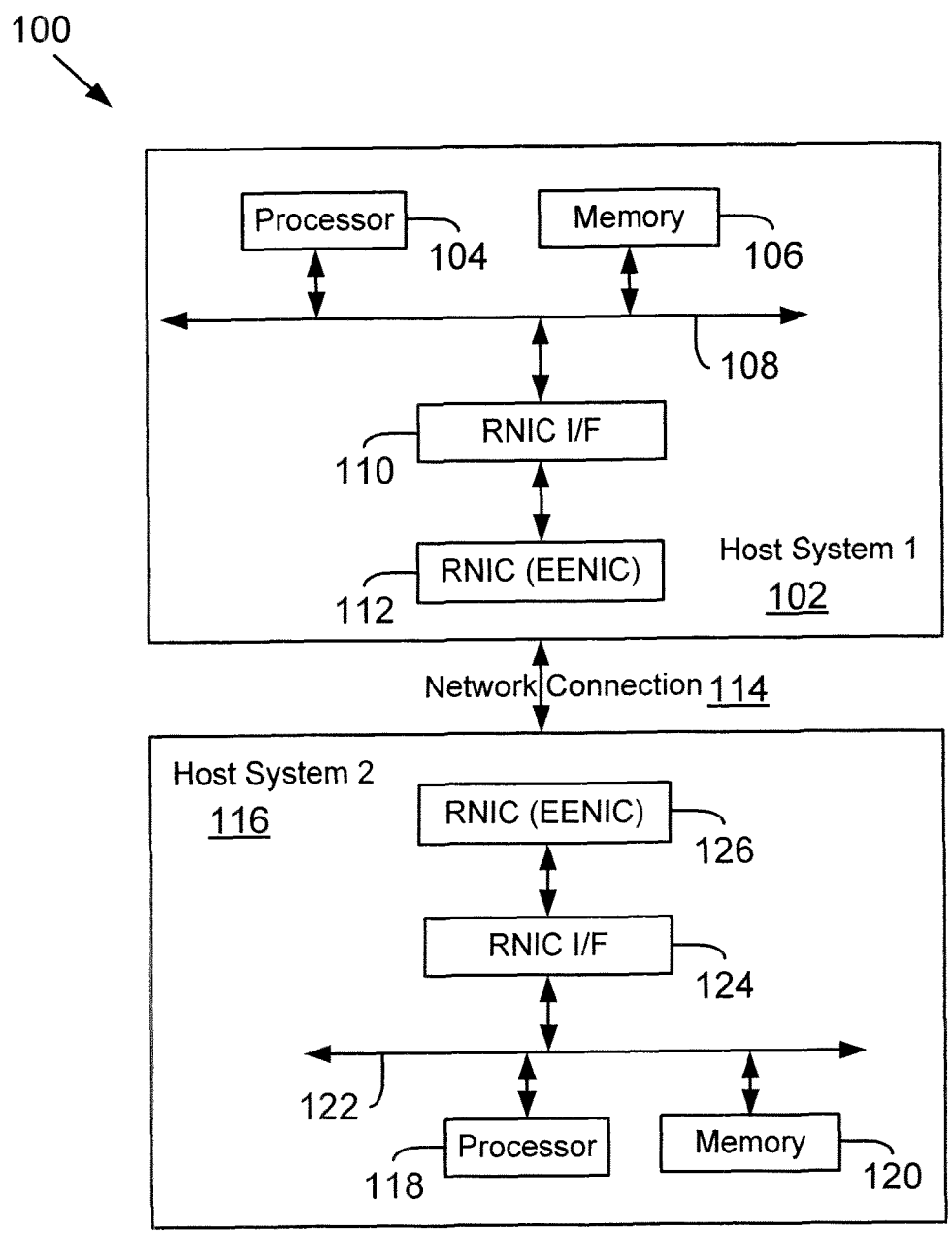
FIG. 1 shows a block diagram of a system for sending and receiving network information, according to one embodiment.

Overall System:

FIG. 1 shows a block diagram of a system 100 for sending and receiving network information, according to one embodiment. System 100 may include a first computing system (or device) 102 (also referred to as host system 102, Host 1 or Host System 1) and a second computing system (or device) 116 (also referred to as host system 116, Host 2 or Host System 2) communicating via a connection 114. Connection 114 may be a network connection. In one embodiment, connection 114 may be an Ethernet connection.

Host systems typically include several functional components. These components may include a central processing unit (CPU) (also referred to as "processor") (for example, 104 and 118), main memory (for example, 106 and 120) (also referred to as host memory), input/output ("I/O") devices (not shown), and other devices, for example, a storage device or media.

In typical host systems, the main memory (106 and 120) is coupled to the CPU (104 and 118) via a system bus (108 and 122) or a local memory bus. The main memory is used to provide the CPU (104, 118) access to data and/or program information that is stored in the main memory (106, 120) at execution time. Typically, the main memory is composed of random access memory (RAM) circuits. A computer system with the CPU and main memory is often referred to as a host system.

Host system 102 communicates with host system 116 via a network interface card (NIC) 112. A NIC that is able to transfer data from host system memory directly to host system memory of host system 116 is referred to as RNIC (as shown in FIG. 1) and is compliant with the Ethernet Direct Data Placement (EDDP) format, according to one embodiment, may be referred to as EENIC (or RNIC).

A RNIC interface (for example, 110, 124) interfaces between a processor (104, 118) and a RNIC (112, 126).

Protocols:

Computing systems and devices (for example, 102 and 116) typically use various protocols/standards for network communication. The following provides a brief introduction to some of the standards/protocols:

Transmission Control Protocol/Internet Protocol ("TCP/IP"): TCP is a network protocol that provides connection-oriented, reliable, byte stream service. In a TCP connection, two network nodes, which includes network device and networked computing systems, may establish a logical connection before sending data. TCP maintains state information regarding the data transfer and data is delivered in the same order that it was sent. A byte stream service means that TCP views data to be sent as a continuous data stream that is sent in any way it sees fit and delivers it to the remote node as a byte stream.

The IP standard protocol provides a datagram service whose function is to enable routing of data through various network subnets. Each of these subnets could be a different physical link such as Ethernet, ATM, or others. IP is also responsible for fragmentation of transmit data to match a local link's maximum transmission unit (MTU). IP can fragment data at a source node or at any intervening router between the source and a destination node.

"RDMA" means the Remote Direct Memory Access (RDMA), which is a standard upper layer protocol ("ULP") that assists one network device to directly place information in another host system memory with minimal demands on memory bus bandwidth and CPU processing overhead. RDMA over TCP/IP defines the interoperable protocols to support RDMA operations over standard TCP/IP networks.

RDMA may also be interchangeably referred to as "RDMAP" throughout the specification and drawings.

"DDP" means the Direct Data Placement (DDP) protocol that allows one to place data received by a computing system directly into an upper layer protocol (ULP) buffer without using intermediate buffers. The RDMA/DDP protocol typically uses a reliable system, for example, TCP/IP. However, the effort and resources spent in processing TCP/IP information/fields increases latency and makes a system complex. The adaptive embodiments disclosed herein solve this problem by providing a new protocol called Ethernet Direct Data Placement ("EDDP") that is described below in detail.

"Enhanced Ethernet": Enhanced Ethernet or Data Center Bridging Ethernet (DCB) is a new protocol that is being proposed for use in storage area networks and other applications. DCB however lacks the reliability of TCP/IP. To effectively use DCB with RDMA/DDP, a new protocol/format is needed so that one can use the advantages of RDMA/DDP. In one embodiment, EDDP is proposed for using RDMA/DDP with DCB.

EDDP: EDDP is a proposed new protocol, according to one embodiment. EDDP may enable a ULP to send information to a Data Sink (a network device/system that receives information, for example, Host System 1, 102, FIG. 1) without having the Data Sink to place the data in an intermediate buffer. Thus when information is sent by host system 116 to host system 102, RNIC 112 can place the data directly to an assigned ULP buffer. Hence, host system 102 consumes less memory bandwidth than a "buffered mode" where host system 102 moves data from an intermediate buffer to the final destination, i.e. host memory 108. Additionally, fewer CPU cycles are consumed because RNIC moves the data directly to a buffer in memory 106, as described below. EDDP preserves ULP record boundaries (messages) while providing a variety of data transfer mechanisms and completion mechanisms to be used to transfer ULP messages. EDDP uses DCB as its Lower Level Transport instead of TCP/IP.

Figure 2:
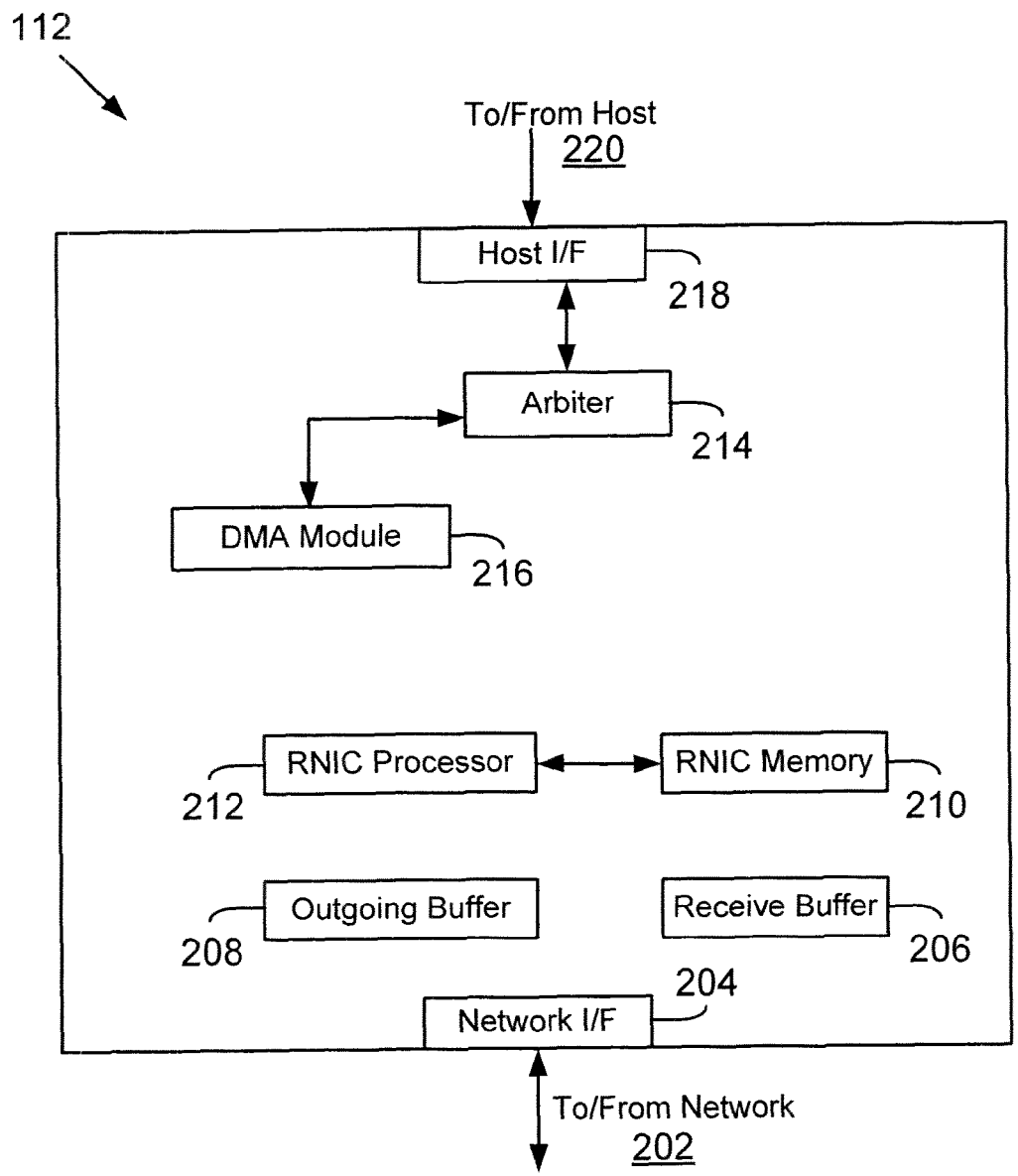
FIG. 2 shows a block diagram of a network interface card, according to one embodiment.

EENIC/RNIC:

Before describing EDDP in detail, RNIC (or EENIC used interchangeably throughout the specification and drawings) 126) is described below with respect to FIG. 2. RNIC 112 receives and sends network packets 202 via a network interface 204 and a network connection 114 (FIG. 1). The structure of network interface 204 depends on the type of protocol and network environment.

A receive buffer 206 is used to store packets as soon as they are received. Outgoing buffer 208 is used to stage packets before being sent to the network.

Host interface 218 is used to interface with a host system via a bus 220. In one embodiment, bus 220 may be a PCI, PCI-X, PCI-Express or any other type of bus.

A direct memory access (DMA) module 216 sends DMA requests to an arbitration module (or Arbiter) 214 to access bus 220 for sending data to the host system. Arbitration module 214 arbitrates between competing requests and grants bus access to a request that wins the arbitration scheme.

Processor (may also be referred to as RNIC processor) 212 executes instructions out of RNIC memory 210. In one embodiment, more than one processor 212 may be used to send and receive network information. For example, a separate processor (or state machine) may be used to handle receive operations (i.e. packets received by RNIC processor 112) and another processor (or state machine; may be used to handle outgoing operations (i.e. packets transmitted by RNIC 112).

Figure 3:
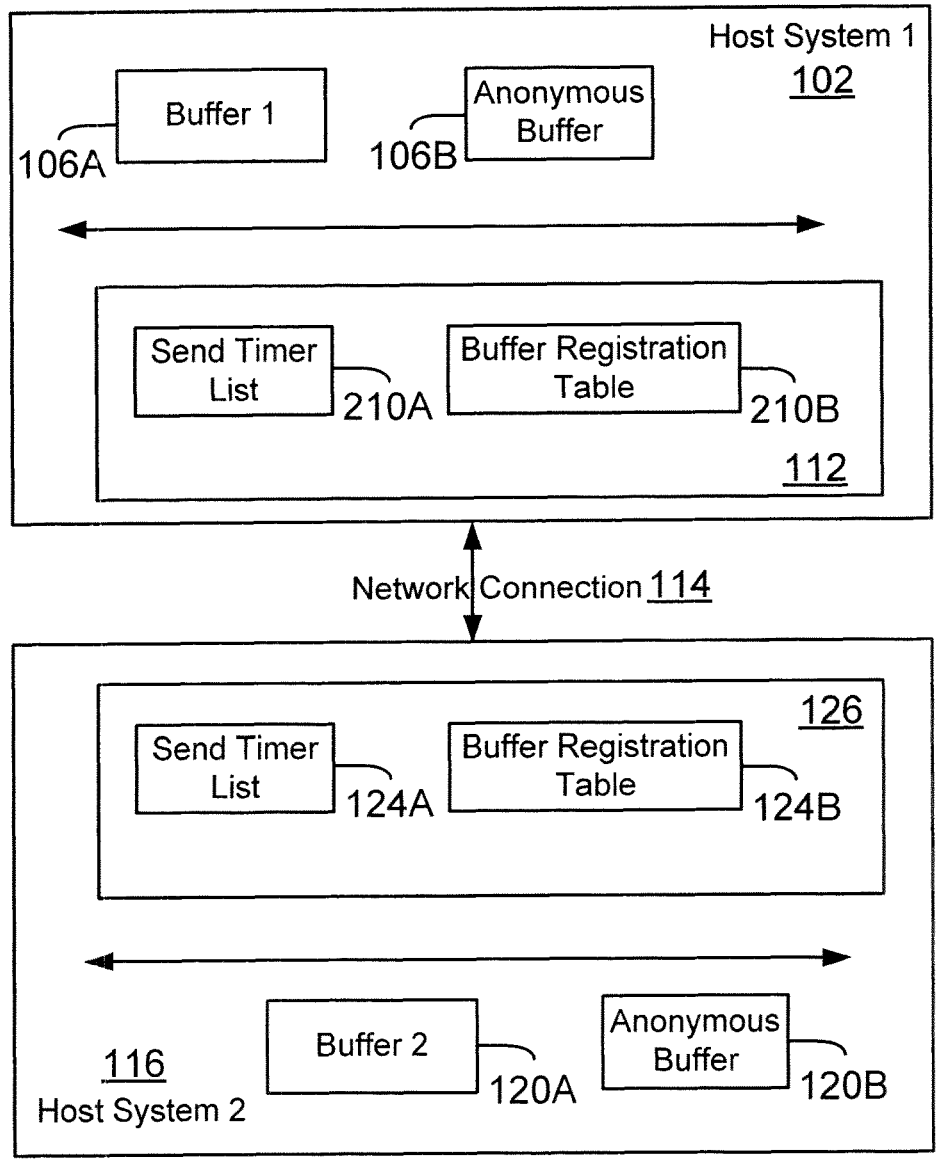
FIG. 3 shows a block diagram of memory system layout, according to one embodiment.

Memory Layout:

FIG. 3 shows a block diagram of memory system layout both at the host system level and the RNIC level. Host system 112 may allocate a buffer 106A (shown as Buffer 1) that can receive data directly from host 116 via RNIC 112 in a "tagged buffer" mode. RNIC 112 may maintain a send timer list 210A and a buffer registration table 210B that are described below. Anonymous buffer 106B is also maintained to receive data in an "untagged buffer mode" as described below.

Host system 116 maintains a Buffer 120A (shown as Buffer from where data is sent directly via RNIC 126 to host system 102. RNIC 126 also maintains a send timer list 124A and a buffer registration table 124B that is described below. Host system 116 also maintains anonymous buffers 120B, similar to host system 102.

EDDP Overview:

EDDP supports two types of data transfer processes "Tagged Buffer" mode and "Untagged Buffer" mode. During the Tagged Buffer mode, a Data Sink (for example, Host 102 receiving data from host 116) sends an identifier (referred to as a Steering Tag (STag)) for a ULP buffer (for example, Buffer 1, 106A (FIG. 3) to the Data Source (i.e. host 116). The STag is transferred to the Data Source using a ULP defined method. Once the Data Source ULP has a STag for a destination ULP buffer, it can request that the EDDP layer send the ULP data directly to the destination ULP buffer by specifying the STag to EDDP. The Tagged Buffer, 106A does not have be filled starting at the beginning of the ULP buffer. The ULP Data Source can provide an arbitrary offset into the ULP buffer.

The Untagged Buffer Mode uses anonymous buffers (for example, 106B and 120B, FIG. 3) and enables data transfer without having the Data Sink to Advertise a ULP Buffer to the Data Source. The Data Sink queues up a series of receive ULP buffers. An Untagged EDDP Message from the Data Source consumes an Untagged Buffer (for example, 106B) at the Data Sink. Because EDDP is message oriented, even if the Data Source sends an EDDP Message payload smaller than the receive ULP buffer, the partially filled receive ULP buffer is Delivered to the ULP anyway.

The Tagged and Untagged Buffer Mode are Different in the Following Manner:

(a) For the Tagged Buffer Mode, the Data Source specifies which received Tagged Buffer will be used for a specific Tagged EDDP Message (sender-based ULP buffer management). For the Untagged Buffer Mode, the Data Sink specifies the order in which Untagged Buffers are consumed as Untagged EDDP Messages are received (receiver-based ULP buffer management).

(b) For the Tagged Buffer Mode, the ULP at the Data Sink advertises the ULP buffer to the Data Source through a ULP specific mechanism before data transfer can occur. For the Untagged Buffer Mode, data transfer can occur without an end-to-end explicit ULP buffer Advertisement.

(c) For the Tagged Buffer Mode, an EDDP Message can start at an arbitrary offset within the Tagged Buffer. For the Untagged Buffer Mode, an EDDP Message starts at offset 0.

(d) The Tagged Buffer Mode allows multiple EDDP Messages targeted to a Tagged Buffer with a single ULP buffer Advertisement. The Untagged Buffer Mode associates a receive ULP buffer for each EDDP Message targeted to an Untagged Buffer.

Either data transfer Mode places a ULP Message into an EDDP Message. Each EDDP Message is then sliced into EDDP PDUs that are intended to fit within the Ethernet layers Maximum Transmission Unit. Thus the ULP can post arbitrary size ULP Messages, including up to $2^2-1$ octets of ULP Payload, and EDDP slices the ULP message into EDDP PDUs which are reassembled transparently at the Data Sink.

The DDP layer provides in-order Delivery for the ULP. However, EDDP differentiates between Data Delivery and Data Placement. EDDP provides enough information in each EDDP PDU to allow the ULP Payload in each inbound EDDP PDU to be directly placed into the correct ULP Buffer, even when the EDDP PDUs arrive out-of-order. Thus, EDDP enables the reassembly of ULP Payload contained in EDDP PDUs of an EDDP Message into ULP Message to occur within the ULP Buffer, thus eliminating the traditional copy out of the reassembly buffer into the ULP Buffer.

An EDDP Message's payload is delivered to the ULP when: (a) All EDDP PDUs of an EDDP Message have been received and the payload of the EDDP Message has been placed into the associated ULP Buffer; (b) All prior EDDP Messages have been placed, and (c) All prior EDDP message deliveries have been performed.

RDMA Protocol (RMAP) Structure:

FIG. 4 shows a layered architecture 400 using TCP/IP with RDMA and DDP. Layered architecture 400 includes Ethernet 402 for network connectivity. TCP layer 406 and IP layer 404 are used as the transport layers. SCTP (Stream Control Transmission Protocol) 405 may also be used as a transmission protocol. MPA layer 408 is above the TCP layer 406.

RDMA 412 (also referred to as RDMAP 412) and DDP 410 are used to place data directly into a host memory. ULP 414 is an upper layer protocol. In one example, ULP 414 may be an operating system of a computing system.

Architecture 400 has disadvantages. For example, handling TCP/IP traffic may slow overall data processing and hence is undesirable. The various embodiments disclosed herein overcome these shortcomings by not using TCP/IP and instead using EDDP.

EDDP Architecture:

FIG. 5 shows EDDP architecture 500, according to one embodiment. EDDP structure does not have to use TCP/IP. EDDP architecture 500 may include data center bridging Ethernet (also referred to as "DCB Ethernet") 502 as the network protocol. EDDP 504 replaces the transport protocol. RDMA 506 is layered above EDDP 504. ULP 508 is an upper layer protocol using RDMA, while ULP 510 may not use RDMA.

Ethernet/EDDP/RDMA Header Layout:

FIG. 6 shows a layout 600 of the various headers when EDDP is layered below RDMA and above DCB Ethernet, as shown in FIG. 5. Layout 600 includes Ethernet cyclic redundancy code (CRC) 602 and EDDP CRC 604, used for error checking. The RDMA payload 606 is accompanied by a RDMA header 608. Layout 600 also includes an EDDP header 610 and an Ethernet header 612. Ethernet header 612 is a standard header used for Ethernet based network communication. The EDDP header 610 is shown in FIG. 7 and described below.

EDDP Header:

FIG. 7 shows an example of EDDP header 610 fields that may be used, according to one embodiment. The various EDDP header fields are described below:

OpCode 702: The OpCode field 702 indicates an EDDP PDU type identified by the PDU Type unique fields 708. Examples of EDDP PDU Types are as follows:

| Type | Value | Description |
|---|---|---|
| Request PDU | 0 × 0 | EDDP Connection Request PDU |
| Reply PDU | 0 × 1 | EDDP Connection Response PDU |
| Tagged PDU | 0 × 2 | EDDP Tagged Buffer PDU |
| Untagged PDU | 0 × 3 | EDDP Untagged Buffer PDU |
| Tagged Message Acknowledgement PDU | 0 × 4 | ULP Tagged Message Acknowledgement PDU |
| Unused | 0 × 5 | Undefined |
| Untagged Message Acknowledgement PDU | 0 × 6 | ULP Untagged Message Acknowledgement PDU |
| Unused | 0 × 7 | Undefined |

(b) Payload_Length 704: The Payload_Length 704 field provides a size of ULP data included in an EDDP PDU.

(c) control field 706: The Control field 706 may include several fields/flags, for example:

(i) A Last flag ("L") which specifies whether an EDDP PDU is a Last PDU of an EDDP Message. If the Last flag is set to a certain value, for example, one, the EDDP Message payload is delivered to a ULP after placement all EDDP PDUs of a current EDDP Message and all prior EDDP Messages. If the Last flag is set to another value, for example, zero, the EDDP PDU is considered as an intermediate EDDP PDU.

(ii) Acknowledgement Request Flag ("R" bit): The R bit may be set to a certain value, for example, 0 for intermediate PDUs of a ULP Message sequence. The R bit may be set to 1 on a last PDU of a ULP Message to "Request" an Acknowledgement from a remote host system indicating that the message was successfully received.

(iii) Negative Acknowledge/Initial PDU ("N/I" flag"):

The definition of the N/I flag depends on a PDU OpCode type, for example:

(i) Untagged/Tagged Buffer PDU: If the PDU type is Untagged or Tagged Buffer type then this flag may indicate if the PDU is an initial PDU of an Untagged/Tagged Message.

(ii) Untagged/Tagged Message Acknowledgement PDU: If the PDU type is an Untagged/Tagged Message Acknowledgement then this flag may be used to indicate if the PDU is an Acknowledgement or a Negative Acknowledgement of an Untagged or Tagged Message.

(iii) The N flag may indicate that an Acknowledgement PDU is a "Negative Acknowledgement" by a receiving EDDP host system that has not received a ULP message indicated by a Message Sequence Number field.

(iv) Finished Flag ("F"): The F flag when set may indicate that an originating EDDP host system is finished with half of an EDDP connection and requests a remote host to close its half of the connection.

(d) ULP Reserved Field 714: The ULP Reserved field 714 is opaque to the EDDP protocol and may be structured in any way by a ULP. At a Data Source, EDDP may set the ULP Reserved Field 714 to a value specified by the ULP. It is transferred unmodified from the Data Source to a Data Sink. At the Data Sink, EDDP provides the ULP Reserved field 714 to the ULP when the EDDP Message is delivered. Each EDDP PDU within a specific EDDP Message includes the same value for this field. The Data Source ensures that each EDDP PDU within a specific EDDP Message includes the same value for this field.

(e) The PAD field 710 trails the ULP PDU and may be between zero and a certain size, for example, three octets of data. The pad data may be set to zero by a sender and ignored by the receiver (except for CRC checking). The length of the pad may be set so as to make the size of the EDDP PDU an integral multiple of four.

(f) CRC 712: CRC 712 may include a check value, which may be used to verify the contents of an EDDP PDU.

Different type of EDDP PDUs may have different fields and different values. FIGS. 8-13 provide examples of some of the PDU formats, according to the adaptive embodiments of the present disclosure.

EDDP Tagged Buffer PDU:

FIG. 8 shows a block diagram of an EDDP Tagged Buffer PDU structure 800. Some fields (for example, PAD 822 and CRC 824) in the EDDP Tagged Buffer PDU structure 800 are similar to the EDDP header 610 fields (for example, PAD 710 and CRC 712) shown in FIG. 7 and described above. The various fields of PDU structure 800 are described below:

Payload_Length (unsigned integer) 802: The Payload_Length field 802 provides a size of the ULP data included in an EDDP PDU. The size may be provided in number of octets.

"L" 804 means a "Last" PDU flag: The L bit 804 may be reset to zero on intermediate PDUs of a ULP Message sequence. The L bit may be set to 1 on the last PDU of the ULP Message "R" 806 means an Acknowledgement Request flag. The R bit 806 may be set to zero on intermediate PDUs of a ULP Message sequence. The R bit may be set to 1 on the last PDU of the ULP Message to "Request" an Acknowledgement from another system.

"I" 808 means an "Initial" PDU flag. The I flag 808 may be set to 1 on a first PDU of a Tagged Buffer Message. The I flag 808 may be reset on intermediate PDUs and a last PDU of a Tagged Buffer Message.

OpCode 810 for a Tagged Buffer PDU may be set to a certain value, for example, 0x2.

ULP Reserved ("Rsrvd") field 812 is a reserved field for use by the ULP 508 (FIG. 5).

Destination Connection Handle 814 is a field that includes a "Connection Handle" passed by a remote system during connection establishment. The remote system uses this field to identify a context of a connection.

Message Identification may include a STag field 816 and a Tagged Offset 818 in an initial PDU of a Tagged Message. STag 816 is a Steering Tag that identifies a Data Sink's Tagged Buffer (for example, 106A) and is associated with an EDDP Connection. At a Data Source, STag 816 is set by EDDP to a value specified by the ULP. At the Data Sink, the EDDP provides the STag field when the ULP Message is received. Each EDDP PDU within a specific EDDP Message includes the same value for this field and the value is supplied by the ULP. The Data Source ensures that each EDDP PDU within a specific EDDP Message includes the same value for this field.

Tagged Offset 818: The Tagged Offset 818 specifies an offset, for example, in octets, within a Data Sink's Tagged Buffer, where the placement of a ULP Payload 820 in an EDDP PDU starts. An EDDP Message may start at an arbitrary Tagged Offset within a Tagged Buffer.

Untagged Buffer PDU:

FIG. 9 shows an Untagged Buffer PDU format having a plurality of fields. Some fields in the Untagged format are similar to the Tagged PDU format shown in FIG. 8 and described above. The other fields are described below.

Payload_Length Field 902 is similar to field 802 described above with respect to FIG. 8.

"L" flag 904 may be set to zero on intermediate PDUs of a ULP Message or set to 1 on a last PDU of the ULP message.

"R" flag 906 is an "Acknowledgement Request" flag and may be zero on intermediate PDUs of a ULP Message sequence. The R flag may be set to 1 on a last PDU of the ULP Message to "Request" an Acknowledgement from a remote system that the message was successfully received.

"I" flag 908 is an initial flag that may be set to 1 on a first PDU of an Untagged Buffer Message. The I flag 908 may be reset on intermediate PDUs and for a last PDU of an Untagged Buffer Message.

OpCode 910 for an Untagged Buffer PDU may be set to a certain value, for example, 0x3.

ULP Rsrvd field 912: The ULP Rsrvd field 912 is opaque to the EDDP protocol and may be set by the ULP. At a Data Source, EDDP may set the ULP Rsrvd Field 912 to the value specified by the ULP. It is transferred unmodified from the Data Source to a Data Sink. At the Data Sink, EDDP provides the ULP Rsrvd field 912 to the ULP when the ULP Message is received. Each EDDP PDU within a specific EDDP Message may include the same value for the ULP Rsrvd field. At the Data Sink, the EDDP implementation does not have to verify that the same value is present in the ULP Rsrvd field of each EDDP PDU within a specific EDDP Message and may provide the value from any one of the received EDDP PDU to the ULP when the ULP Message is delivered.

QN 915 is a Queue Number for identifying a Data Sink's Untagged Buffer queue. For example, 0 may be used to identify a Send Queue; 1 may be used for a RDMA Read Request Queue; and 2 may be used to identify a Terminate Queue. Each EDDP segment within an EDDP message includes the same value for this field and which is supplied by the ULP at the Data Source. The Data Source ensures that each EDDP PDU within a specific EDDP Message includes the same value for this field.

Destination Connection Handle 914 may include a Connection Handle passed by a remote system during connection establishment. The remote system uses this field to identify the context of the connection.

Message Sequence Number 916 may be used to identify a sequence number. The sequence number may be increased by one (modulo 2^32) with each EDDP Message targeting a Queue Number of an EDDP Connection that is associated with an EDDP PDU. The initial value for Message Sequence Number may be one. The Message Sequence Number value may wrap to 0 after a value of 0xFFFFFFFF. Each EDDP segment within a specific EDDP message may include a same value for this field. The Data Source ensures that each EDDP PDU within an EDDP Message includes the same value for this field.

Message Offset 918 may be used to indicate an offset, for example, in octets, from the start of an EDDP Message represented by the Message Sequence Number and Queue Number on an EDDP Connection associated with the EDDP PDU. The Message Offset referencing the first octet of an EDDP Message may set to zero by the EDDP layer.

The ULP Reserved field 920 is also opaque to the EDDP protocol and can be structured in any way by the ULP. At a Data Source, EDDP sets ULP Rsrvd Field 920 to a value specified by the ULP. The set value is transferred unmodified from the Data Source to a Data Sink. At the Data Sink, EDDP provides the ULP Rsrvd field 920 to the ULP when the ULP Message is delivered. Each EDDP PDU within a specific EDDP Message includes the same value for the ULP Rsrvd field.

EDDP Request PDU:

FIG. 10 shows an example of an EDDP Request PDU format 1000, according to one embodiment. Some fields (for example, pad 1022 and CRC 1024) in the EDDP Request PDU format 1000 are similar to the EDDP untagged buffer PDU format 900 (for example, pad 924 and CRC 926) shown in FIG. 9 and described above. The various fields of the Request PDU are described below.

Private Data Length 1002 field may include a length of a Private Data field. A value of zero may be used to indicate that there is no Private Data field present at all. If a receiver (for example, host 102 receiving information from host 116) detects that a Private Data Length field does not match the length of the Private Data field, or if the length of the Private Data field exceeds a certain value, for example, 512 octets, the receiver closes the connection. Otherwise, the EDDP receiver may pass the Private Data Length value and Private Data to the ULP.

L field 1004 and R field 1006 is similar to 904 and 906, respectively, described above with respect to FIG. 9.

"F" (Finished) field 1008 may be used to terminate a connection. When set to a certain value, for example, 1 the sender (for example, host 116) indicates that it seeks termination of a connection. If the F bit is set to another value, for example, 0, it may indicate that the sender is requesting a new connection.

OpCode 1010 may be set to a certain value, for example, 0x0.

Ver field 1015 indicates an EDDP Version. This field includes a "Revision" of the EDDP Protocol.

Initiator Connection Handle 1014 field may include a Connection Handle of an Initiator (i.e. an entity that initiates a connection, for example, host 116 when it initiates a connection with host 102). The Responder (for example, host 102) saves the value and includes it in PDUs that are sent to the initiator (for example, host 116).

Initiator's port number 1016 includes an initiator's port number, while responder's port number 1018 includes a responder's port number.

Private Data field 1020 may include any value defined by ULPs or may not be present.

EDDP Response Frame Format:

FIG. 11 shows an example of an EDDP response frame format, according to one embodiment. The various fields in an EDDP response (for example, pad 1122 and CRC 1124) are similar to an EDDP request (for example, pad 1022 and CRC 1024) that is described above with respect to FIG. 10. The following provides a description of EDDP response fields.

Private Data Length field 1102 includes a length of a Private Data field. A certain value, for example, zero indicates that there is no Private Data field present at all. If a receiver (for example, host 102 receiving information from host 116) detects that the Private Data Length field does not match the length of the Private Data field, or if the length of the Private Data field exceeds a certain value, for example, 512 octets, the receiver closes the connection and reports an error locally. Otherwise, the EDDP receiver passes the Private Data Length value and Private Data to the ULP.

L field 1104 and R field 1106 is similar to fields 1004 and 1006 described above with respect to FIG. 10.

"F" (Finished) field 1108 may be used to signal the acceptance or rejection of an EDDP Connection by a responder (for example, host 102, if host 116 initiates a connection). If the F bit is set it means that the responder has rejected the connection and will not send or accept any EDDP PDUs except a new EDDP Connection Request PDU. If this bit is clear, it indicates that the responder has accepted the EDDP Connection from the initiator (for example, host 116). The responder will not send any more EDDP PDUs to the initiator until it receives a valid EDDP PDU from the initiator. If the EDDP Connection Response PDU is being sent following a connection shutdown request from a remote system, then the F bit value is set to indicate that the remote system has shut down its end of the connection.

OpCode 1110: The OpCode for an EDDP Connection Response PDU may be set to 0x1.

ULP reserved 1112 is similar to ULP reserved field 1012 (FIG. 10) and ULP reserved Field 912 (FIG. 9) that are described above.

Responder Connection Handle 1114 includes a "Connection Handle" of a Responder. The Initiator (for example, host 116) saves this value and includes it in all PDUs to be sent to the remote peer (i.e. the Responder, for example, host 102).

EDDP Version ("Ver") field 1115 includes a revision value of the EDDP protocol indicating what version of EDDP is being used.

Initiator Port 1116 (i.e. a port that initiates a connection) includes a value for identifying an Initiator port.

Responder Port 1118 field includes a value identifying a Responder's port.

Private Data 1120 field includes any value defined by ULPs. The Private Data field may be of any size, for example, between 0 and 512 octets in length. ULPs define how to size, set, and validate this field.

Pad 1122 field indicates a size of padded bits used in the EDDP response and CRC 1124 includes the CRC for validating the EDDP PDU.

EDDP Untagged Buffer Acknowledgement PDU Format:

FIG. 12 shows an example of an Untagged EDDP Buffer Acknowledgement PDU Format 1200. The format includes various fields similar to the fields described above with respect to FIGS. 8-11. The following describes the other fields within format 1200

Field 1202 may be unused, while the "L" field 1204 may be set to a certain value, for example, 1.

R field 1206 is similar to the R field 1106 described above with respect to FIG. 11.

"N" BIT 1208 is a Negative Acknowledgement flag. When set, the N flag indicates that an Acknowledgement PDU is a Negative Acknowledgement sent by a receiving EDDP Consumer indicating that it has not received the ULP message indicated by the Message Sequence Number field 1218. When reset the N flag is an Acknowledgement by the receiving EDDP Consumer indicating that it has received the ULP message indicated by the Message Sequence Number field 1218.

"F" field 1210 is similar to F field 1108, described above with respect to FIG. 10.

ULP Reserved field 1214 is similar to ULP Reserved field 912, described above with respect to FIG. 9.

OpCode 1212 may be set to a certain value, for example, 0x6.

Destination Connection Handle 1216 field includes a Connection Handle passed by a remote system during connection establishment.

Queue Number ("QN") 1220 is the Queue Number of a message that is being acknowledged (ACKed)/Not acknowledged (NACKed). The Queue Number and Message Sequence Number identify a unique ULP Message.

Message Sequence Number 1218 is a Sequence Number of a message that is being ACKed/NACKed. The Queue Number and Message Sequence Number identify a unique ULP Message.

NACK Offset 1222 indicates an offset of the first octet of missing data. This field is valid if the N flag is set. The NACK Offset informs the sender of the first octet of data to be retransmitted. This allows large messages to be recovered without having to retransmit the entire transfer.

Fields 1204, 1206, 1210 and 1214 are similar to fields 1104, 1106, 1108, and 1112, respectively, described above with respect to FIG. 11.

Figure 13:
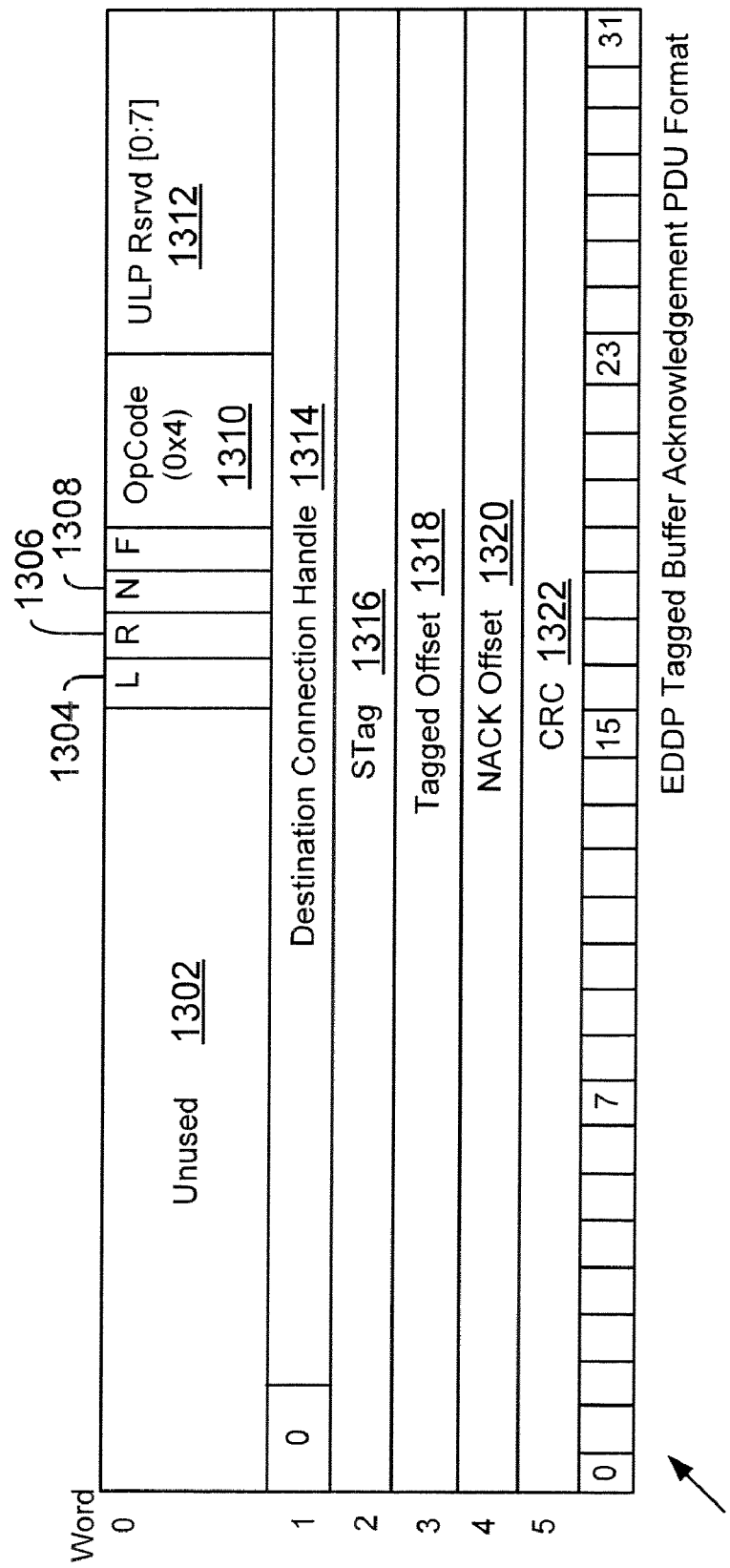

Tagged EDDP Buffer Acknowledgement PDU Format:

FIG. 13 shows an example of a Tagged EDDP Buffer Acknowledgment PDU Format 1300, according to one embodiment. The various fields of format 1300 are described below.

Negative Acknowledgement ("N") flag 1308 when set indicates that a remote EDDP system has not received the ULP message indicated by a STag 1318 and Tagged Offset field 1320. When reset the N flag 1308 indicates the remote EDDP system has received the ULP message indicated by the STag and Tagged Offset fields.

OpCode 1312 for an Acknowledgment Buffer PDU may be set to a certain value, for example, 0x4.

Destination Connection Handle 1314 includes the Connection Handle passed by a remote system during connection establishment.

STag 1318 is a steering tag of a message being Acked/Nacked by the sender.

Fields 1302, 1304, 1306, 1310, 1314, 1322 and 1324 are similar to the fields described above with respect to FIG. 12 above.

EDDP Write Operation

Figure 14:
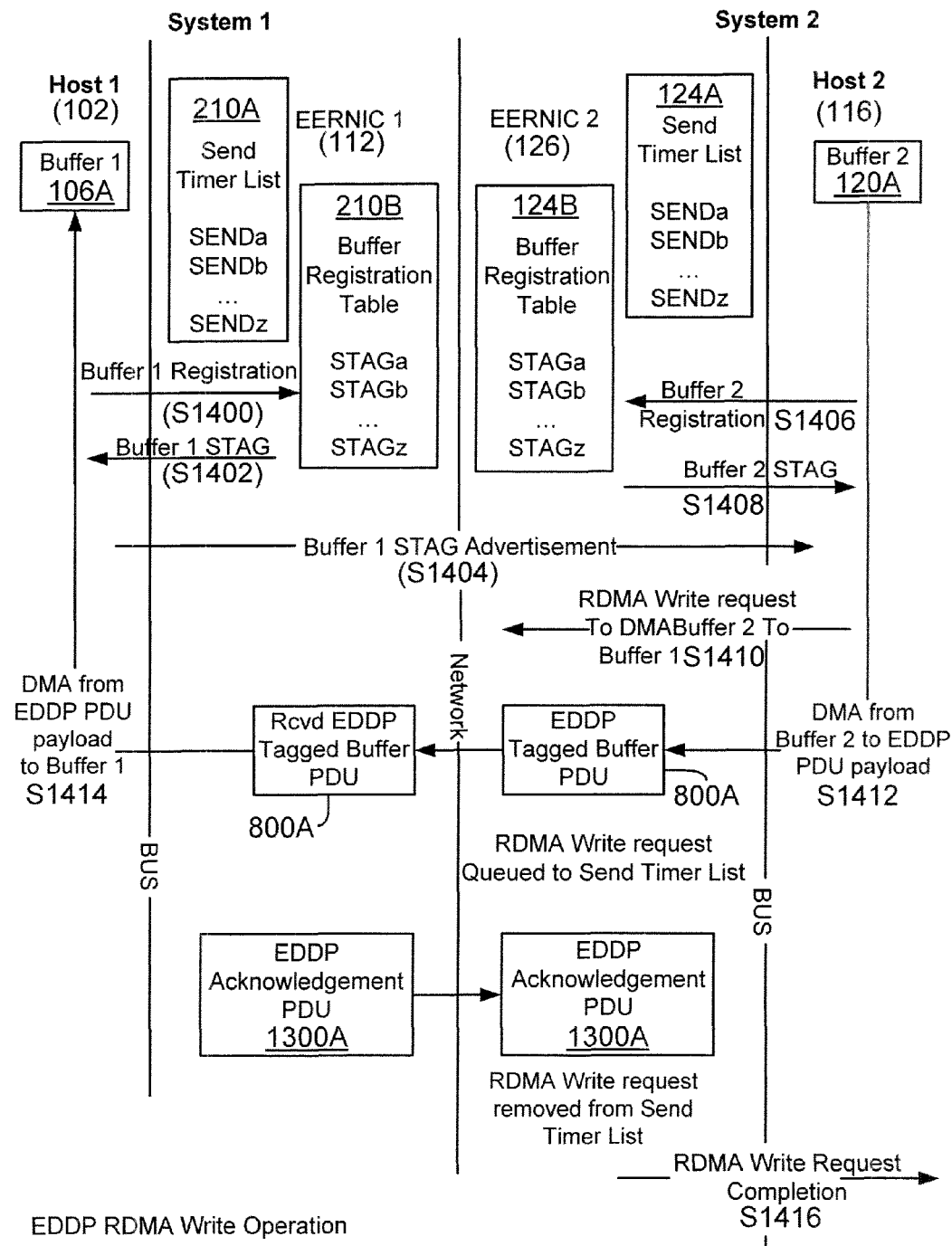
FIG. 14 shows a process/system diagram for performing a RDMA write operation using the EDDP protocol, according to one embodiment.

FIG. 14 shows a process/system diagram performing a RDMA write operation, using the EDDP protocol. In this example, data is written from buffer 120A of Host system 116 to buffer 106A of host system 102.

The process begins when buffer 106A is registered (S1400) with buffer registration table 210B. After the buffer is registered, a STag is issued (S1402) by buffer registration table 210B. Buffer registration table 210B maintains a plurality of STags (shown as STaga, STagb . . . STagz) and assigns these values to different buffers so that the buffer can be uniquely identified during RDMA based communication. After the STag is assigned for Buffer 1 106A it is advertised to host 116 (S1404).

Host 116 also performs the same steps to register Buffer 2 120A, receive a STag for buffer 2 from registration table 124B and then advertise Buffer 2 120A to host 102 (See S1406 and S1408).

In S1410, a write request is issued to send data directly from Buffer 2 to Buffer 1.

In S1412, data from Buffer 2 120A is placed in an EDDP Tagged Buffer PDU payload. The EDDP Tagged Buffer PDU (800A) is sent to host 102. PDU 800A is similar to the format (800) described above with respect to FIG. 8. The write request is queued in send timer list 124A. Send timer list 124A maintains a list of send requests (shown as SENDa, SENDb . . . SENDz). The list allows EERNIC 126 to control the requests as they are being initiated and completed.

PDU 800A is received by EERNIC 112 and in S1414, the payload of EDDP Tagged PDU is moved directly to buffer 1 106A.

Host 102A then sends an EDDP Acknowledgement PDU 1300A whose format is described above with respect to FIG. 13. The write request is removed from send timer list 124A and in S1416, a write completion request is sent to host 116.

Figure 15:
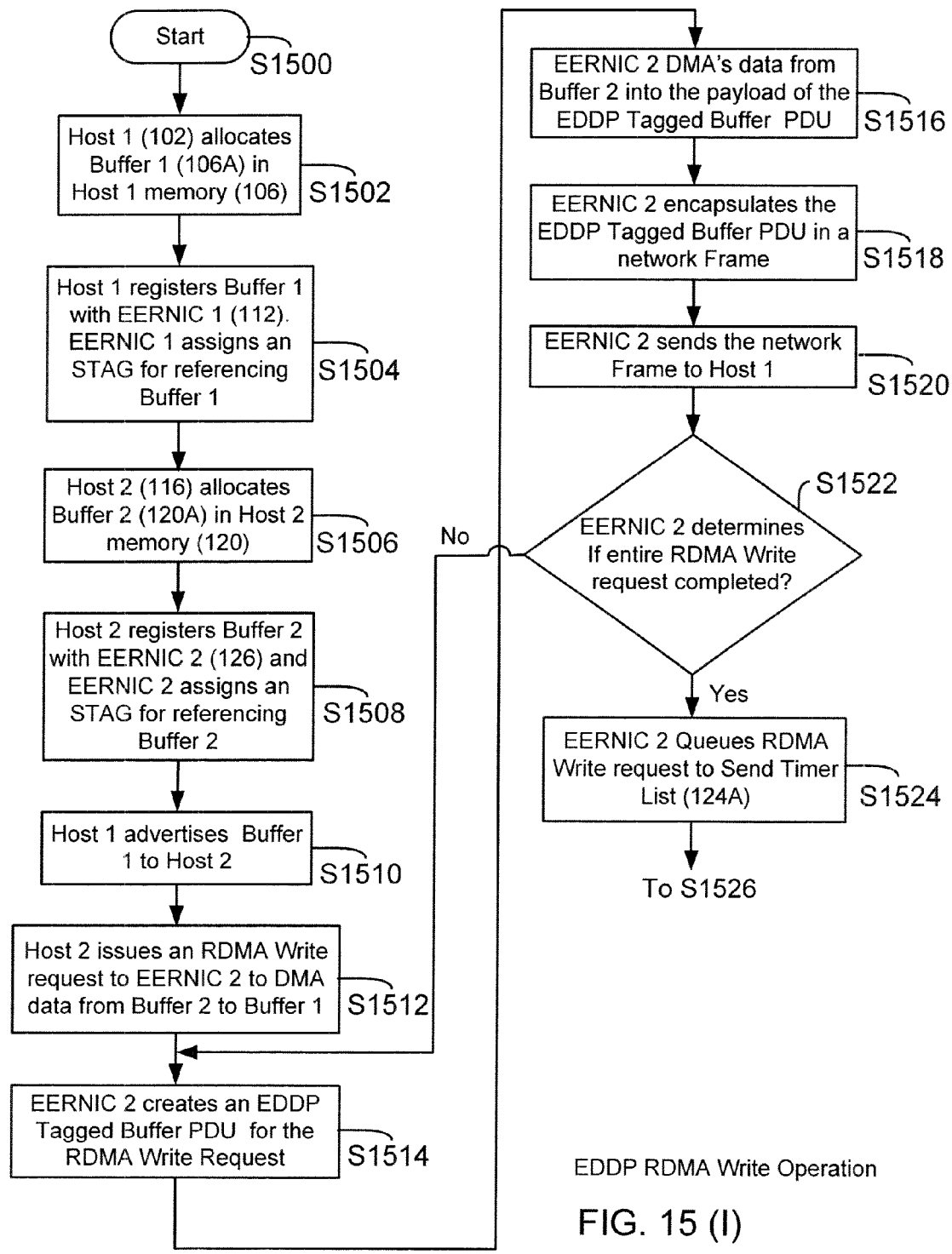
FIG. 15 shows a process flow diagram for performing the RDMA write operation using the EDDP protocol, according to one embodiment.

FIG. 15 shows a detailed process flow diagram for performing the RDMA write operation using the EDDP protocol, according to one embodiment. The process description below assumes that the first host system is 102, the first EERNIC is 112 (See FIGS. 1 and 14) and the second host system (i.e. Host 2) is 116 and the second EERNIC is 126 (See FIGS. 1 and 14).

The process begins in block S1500. In block S1502, a first host system (for example, 102) allocates a buffer 1 in host memory (for example, buffer 1 106A in host memory 106).

In block S1504, host 102 registers buffer 1 with the EERNIC 112 and EERNIC 116 assigns a STag that identifies Buffer 1 106A.

In block S1506, host 116 allocated buffer 2 120A in host memory 120. The buffers are registered in block S1508 and a STag is assigned to buffer 2 120A.

In block S1510, host 102 advertises buffer 1 106A to host 116. This means that an RDMA operation may be conducted where information can be placed directly into Buffer 1 106A.

In block S1512, host 116 issues an RDMA write request to EERNIC 126 to DMA data from buffer 2 120A to buffer 1 106A.

In block S1514, EERNIC 126 creates an EDDP Tagged Buffer PDU (for example, 800A, FIG. 14). In block S1516, EERNIC 126 DMA's (i.e. by using a direct memory access operation) data from Buffer 2 120A as payload for PDU 800A.

In block S1518, EERNIC 2 encapsulates PDU 800A as a network frame, for example, Ethernet frame. In block S1520, the network frame is sent to host 102.

In block S1522, EERNIC 126 determines if the entire RDMA write request has been completed. If not, the process moves to block S1514. If the write request is completed, then in block S1524, the write request is queued in a send timer list (for example, 124A, FIG. 1 and FIG. 14).

In block S1526, network frames are routed from host 116 to host 102.

In block S1528, EERNIC 112 determines if an EDDDP PDU (for example, 800A) is available. If no PDU is available, then EERNIC 112 simply waits. If a PDU is available, then in block S1532, EERNIC 1 112 receives the EDDP tagged Buffer PDU.

In block S1534, EERNIC 112 determines if the frame CRC (for example, Ethernet CRC for an Ethernet frame) and the EDDP CRC (for example, 824, FIG. 8) are valid. If the CRC is not valid, then the frame and the encapsulated PDU is discarded in block S1542.

If the CRC is valid, then in block S1536, EERNIC 112 determines if the EDDP connection is valid. If the connection is not valid, the frame is discarded in block S1542. If the connection is valid the process moves to block S1538.

In block S1538, EERNIC 112 verifies the STag (816, FIG. 8) and Offset (818, FIG. 8) are valid. If invalid, the process ends in block S1540. If valid, the process moves to block S1544.

In block S1544, EERNIC 112 directly moves the EDDP Tagged Buffer PDU to the specified offset provided by the PDU.

In block S1546, EERNIC 112 determines if the last EDDP PDU of the write request has been received. This may be determined by looking at field 804 (FIG. 8). If the PDU is not the last PDU, the process moves back to block S1528.

If the PDU in block S1546 is the last PDU, then in step S1548 EERNIC 112 determines if the entire message has been received. If the entire message is not received then a negative acknowledgement (NACK) is generated in block S1550 (also described below with respect to FIG. 19) and sent to host 116.

If the entire message had been received, then in block S1552, EERNIC 112 creates an EDDP Acknowledgement PDU (for example, 1300, FIG. 13). The PDU is encapsulated in block S1554 and sent out as a network frame to host 116 in block S1556.

In block S1558, EERNIC 126 determines if another EDDP PDU is available. If no PDU is available, the process simply waits. If a PDU is available, then in block S1562, EERNIC 126 receives the network frame (for example, an Ethernet frame) with the EDDP Acknowledgement PDU.

In block S1564, EERNIC 126 determines if the EDDP and frame CRC is valid. If the CRC is invalid, the PDU and the frame are discarded in block S1560. If the CRC is valid, then the process moves to block S1568.

In block S1568, EERNIC 126 scans the send timer list to find the Send request that matches with the received EDDP Acknowledgement PDU. If there is a match in block S1570, then EERNIC 126 notifies host 116 (for example, S1416, FIG. 14) that the write request has been completed in step S1572 and the process ends in block S1574.

If there is no match in block S1570, the process ends in block S1576.

Figure 16:
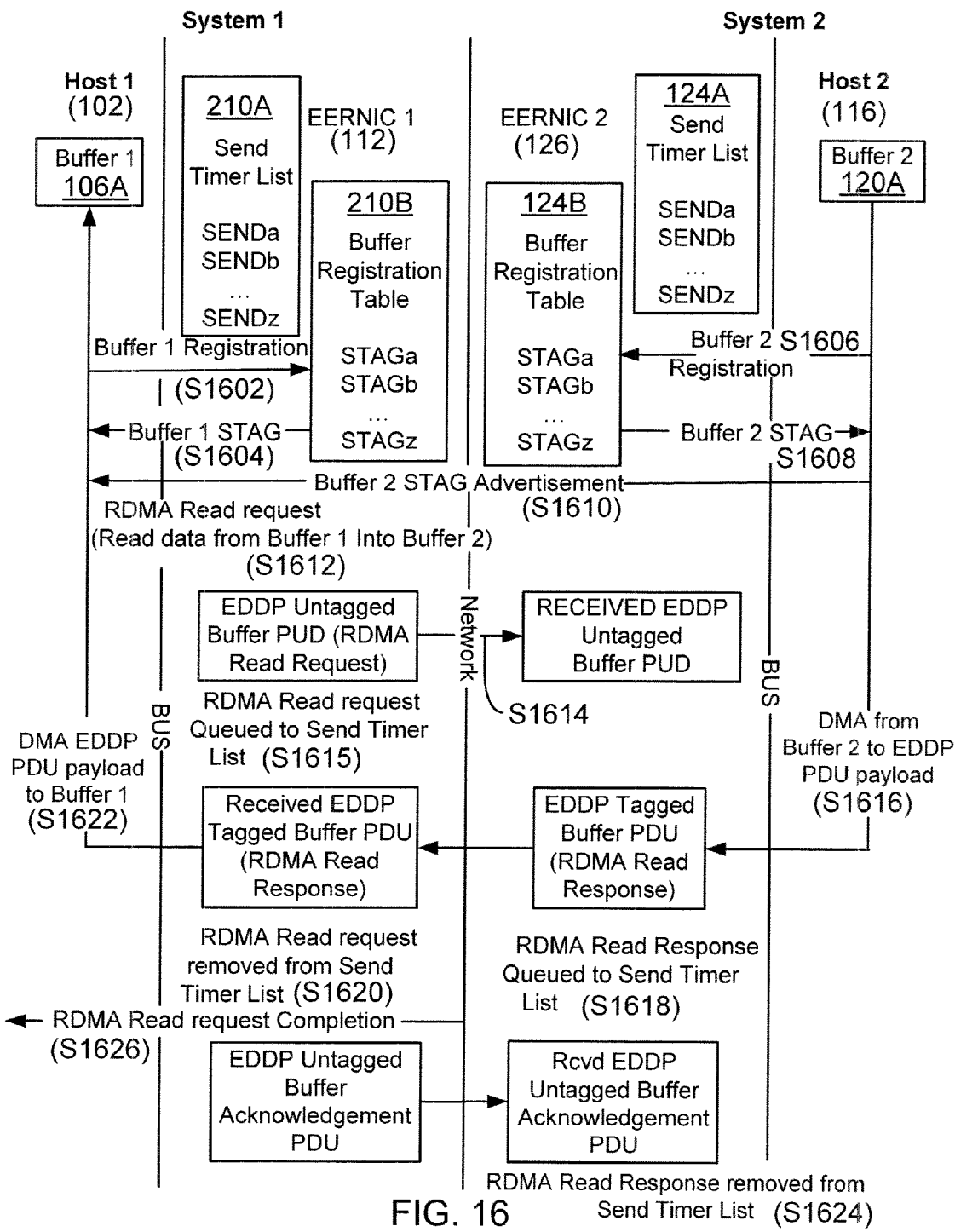
FIGS. 16 and 17 show a system/process diagram for performing a read operation using EDDP, according to one embodiment.
Figure 17:
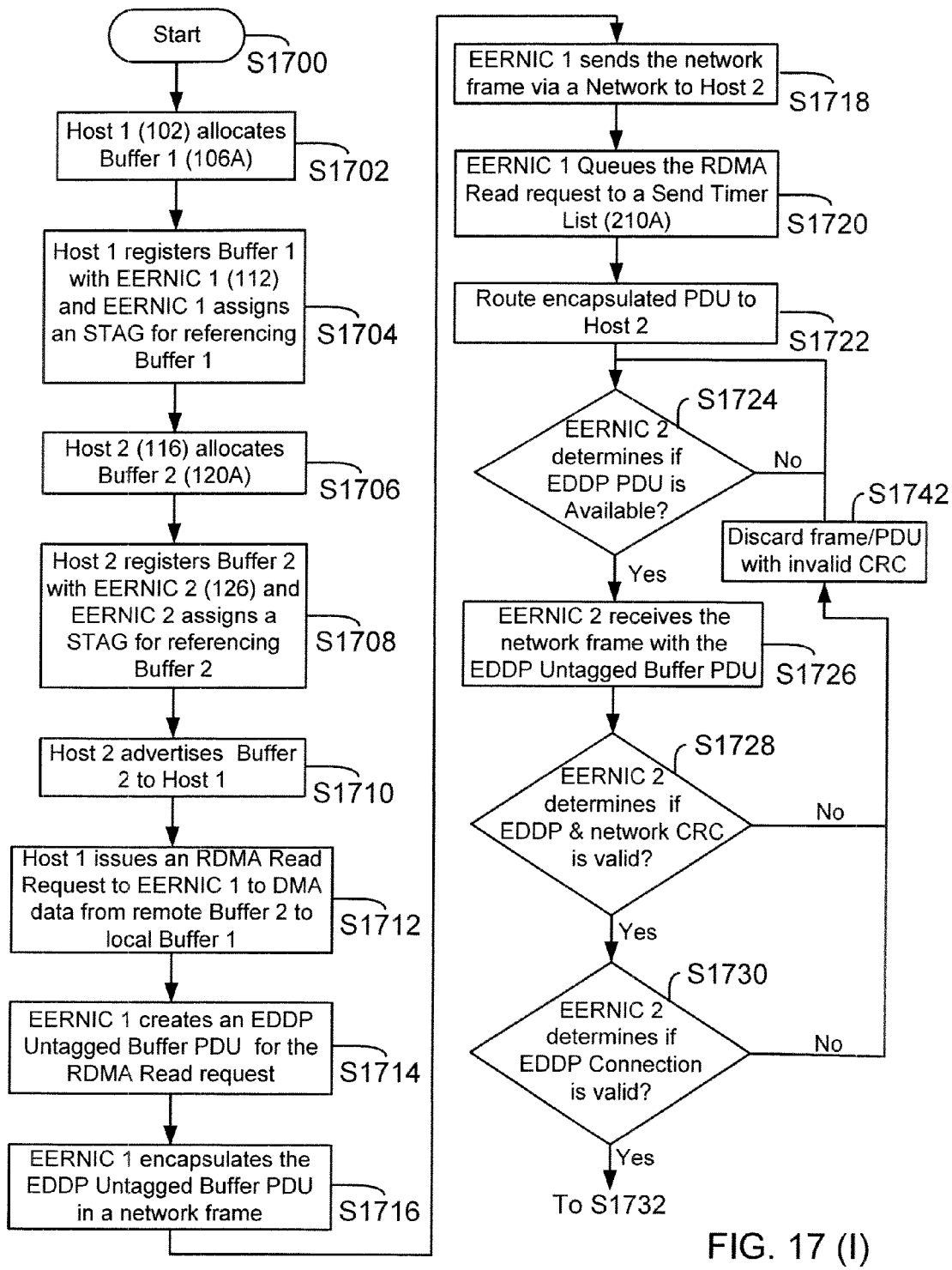

EDDP RDMA Read Operation:

FIGS. 16 and 17 show a system/process diagram for performing a read operation using EDDP, according to one embodiment. In the example of FIGS. 16 and 17 data is read from buffer 2 120A to buffer 1 106A. Both host systems 102 and 116 register their respective buffers, i.e. 106A and 120A respectively (S1602/S1606).

A STag for buffer 1 106A is provided by EERNIC 112 and a STag for buffer 2 120A is provided by EERNIC 126 (S1604 and S1606). Buffer 2 120A is advertised by host 116 (S1610).

Host 102 generates a RDMA read request (S1612) and EERNIC 112 creates an EDDP Untagged Buffer PDU that is sent to host 116 (S1614). The sent read request PDU is added to a Send timer list 210A (S1615). The EDDP Untagged PDU includes Stags of a source buffer (120A) from where information is read and a destination buffer where information is placed (106A)

After performing various checks (i.e. checking CRC, STag, Offset and others), data is DMAed from buffer 2 120A to an EDDP Tagged Buffer PDU (S1616 and S1618). The Read response is queued in send timer list 124A and the EDDP Tagged Buffer PDU is sent to EERNIC 112. After performing various checks, the received response is removed from the send timer list 210A. EDDP PDU payload is then moved directly to Buffer 1 106a (S1622).

EERNIC 112 notifies host 102 and creates an EDDP Untagged Buffer Acknowledgement PDU. The PDU is sent to EERNIC 116 (S1624). After receiving the acknowledgement, EERNIC 126 removes the Read response that was added to the Send Timer list in S1618.

The RDMA read process flow of FIG. 16 is now described in detail with respect to FIG. 17. The process begins in block S1700.

In block S1702, host 102 allocates buffer 106A in host system memory 106. In block S1704, host 102 registers buffer 1 106A with EERNIC 112. EERNIC 112 assigns a STag value for the registered buffer 1 106A.

In block S1706, host 116 allocates buffer 2 120A in host memory 120. In block S1708, Buffer 2 120A is registered with EERNIC 126 and STag is assigned to Buffer 2 120A.

Blocks S1702/S1704 and S1706/S1708 may occur simultaneously.

In block S1710, host 2 116 advertises Buffer 2 to host 1 102.

In block S1712, host 102 issues a RDMA Read request to EERNIC 112 to DMA data from remote Buffer 2 120A to local buffer 1 106A.

In block S1714, EERNIC 112 creates an EDDP Untagged Buffer PDU for the read request. The UnTagged PDU includes STags for both the source (for example, 120A) and destination buffers (106A). An example of the Untagged Buffer PDU format is provided in FIG. 9 that is described above.

In block S1716, EERNIC 112 encapsulates the EDDP Untagged Buffer PDU in a network frame (for example, an Ethernet frame), which is sent to EERNIC 126 in block S1718.

In block S1720, EERNIC 112 queues the read request in the Send Timer list 210A. The network frame is routed to host 116 in block S1722.

In block S1724, EERNIC 126 determines if an EDDP PDU is available. If no PDU is available, the process simply waits. If a PDU is available, then it is received in block S1726.

The EDDP and frame CRC is checked in block S1728. If the CRC is invalid, the frame with the EDDP PDU is rejected in block S1742. If the CRC is valid, then the process moves to block S1730 when the EERNIC 126 determines if the EDDP Connection is valid. EERNIC 126 maintains connection information (for example, in a connection table) to determine if a connection is still valid at any given time. If the connection is not valid, then the frame is discarded in block S1742. If the connection is valid, then the process moves to block S1732.

In block S1732, EERNIC 126 determines if the EDDP STag and Offset are valid. If the STag and Offsets are invalid the process ends in block S1744.

If the STag and offsets are valid, then in block S1734, EERNIC 126 creates an EDDP Tagged Buffer PDU in response to the RDMA Read request. An example of a Tagged PDU is shown in FIG. 8 and described above.

In block S1736, EERNIC 126 DMAs data from buffer 2 120A, as indicated by the source STag and Offset of the read request from host 102. The data is placed in the EDDP Tagged Buffer PDU.

The EDDP Tagged Buffer PDU with the payload is encapsulated in block S1738 and sent to host 102 in block S1740.

In block S1746, EERNIC 126 determines if all EDDP PDUs for the read request have been sent. If not, the process moves back to block S1734. If all the PDUs have been sent, then in block S1748, EERNIC 126 queues. a RDMA Read response in a send timer list (for example, 124A) and network frames are routed in block S1750.

In block S1752, EERNIC 112 determines if any PDUs are available. If not, the process simply waits. If a PDU is available, then EERNIC 112 receives the network frame (for example, an Ethernet frame) with the BODE Tagged Buffer PDU in step S1754. In block S1756, EERNIC 112 checks the frame and EDDP CRC. If the CRC for either is invalid, the frame with the EDDP PDU is discarded in S1760.

If the CRC is valid, then in block S1758, EERNIC 112 determines if the EDDP connection is valid. If the connection is invalid, the frame/PDU is discarded in block S1760.

If the connection is valid, then in block S1762, EERNIC 112 checks the STag and Offset in the EDDP Tagged PDU. If the STag and/or Offset are invalid, the frame is discarded in block S1764. If the STag and Offset are valid, then in block S1766, EERNIC 112 DMAs data from the EDDP payload directly to Buffer 1 106A as indicated by the STag and Offset.

In block S1768, EERNIC 112 determines if the last EDDP PDU for the RDMA Read response has been received. If not, the process moves to block S1752

If the last response has been received, then in block S1770, EERNIC 112 determines if the entire RDMA read message has been received. If not, then in block S1771, a negative acknowledgement (NACK1) is sent. The process for NACK1 is described below with respect to FIG. 19.

If the entire message has been received, then in block S1774, EERNIC 112 notifies host 102 and in block S1776, EERNIC 112 creates an EDDP Acknowledgement for the RDMA Read response from host 116.

In block S1778, EERNIC 112 encapsulates the EDDP Acknowledgement PDU as a network Ethernet frame and the frame is sent in block S1780.

In block S1782, EERNIC 126 determines if a frame has been received. If not, the process waits. If a frame is received, then in block S1786, EERNIC 126 receives the EDDP Acknowledgement PDU and checks for frame and EDDP CRC in block S1788. If the CRC is invalid, the frame with the PDU is discarded in block S1784.

If the CRC is valid, then in block S1790, EERNIC 126 scans the Send Timer list 124A. In block S1792, EERNIC 126 determines if the Send Request is found in the Send timer list 124A. If yes, then EERNIC 126 removes the send request from the list in step S1794 and the process ends in block S1796. If the request is not found in the send timer list, then the process ends in block S1798.

Send Message Process Flow:

FIG. 18 shows a process flow diagram for sending a message using EDDP, according to one embodiment. The process may be implemented for sending messages between host 102 and host 116. The process begins in block S1800 and Host 102 allocates buffer 106A in block S1802.

In block S1804, Buffer 106A is registered with EERNIC 112 that assigns a STag for Buffer 106A.

In block S1806, host 116 allocates Buffer 2 120A in host memory 120 and in block S1808 Buffer 2 120A is registered with EERNIC 126. EERNIC 126 then assigns a STag for Buffer 2 120A.

In block S1810, host 102 issues a receive request to EERNIC 112 for buffer 1 106A. In block S1812, host 116 creates a message and in block S1814, issues a Send message request to send data from Buffer 2 120A. In block S1816, EERNIC 126 creates an EDDP Untagged Buffer PDU. An example of the Untagged Buffer PDU format is provided in FIG. 9 that is described above.

In block S1818, EERNIC 126 encapsulates the EDDP Untagged Buffer PDU in a network frame, which is sent to EERNIC 112 in block S1820.

In block S1822, EERNIC 126 determines if the entire message has been sent. If not, the process moves back to block S1816. If the entire message is sent, then the message is queued in the send timer list 124A in step S1824 and in block S1826, the frame is sent to host 102.

In block S1828, EERNIC 112 determines if an EDDP PDU is available. If no PDU is available, the process simply waits. If a PDU is available, then it is received in block S1830.

The EDDP and frame CRC are checked in block S1832. If the CRC is invalid, the frame with the EDDP PDU is rejected in block S1834.

If the CRC is valid, then the process moves to block S1836, when the EERNIC 112 determines if the EDDP Connection is valid. EERNIC 112 maintains connection information (for example, in a connection table) to determine if a connection is still valid at any given time. If the connection is not valid, then the frame is discarded in block S1834. If the connection is valid, then the process moves to block S1838.

In block S1838, EERNIC 112 determines if a received Message Sequence number (for example, 916, FIG. 9) in the EDDP Untagged PDU is similar to an expected sequence number. If the sequence numbers are different a negative acknowledgement (NACK) is sent in block S1840, described below with respect to FIG. 19. If the sequence numbers match, then in block S1842, EERNIC 112 determines if a receive buffer is available. If the buffer is not available, the process ends in block S1844.

If the buffer is available, then in block S1846, EERNIC 112 DMAs data from the payload of the received EDDP Untagged Buffer PDU to the appropriate receive buffer.

In block S1848, EERNIC 112 determines if the last EDDP PDU for the message has been received. If not, the process moves to S1828. If the last message was received, then in block S1850, EERNIC 112 determines if the entire message has been received. If not, then a NACK1 is sent in block S1852 (described below with respect to FIG. 19).

If the entire message had been received, then in block s1854, EERNIC 112 creates an EDDP Acknowledgement PDU and in block S1856, encapsulates the EDDP Acknowledgement PDU in a network frame (for example, an Ethernet frame). The frame is sent to host 116 in block S1858 and routed to host 116 in block S1860.

In block S1862, EERNIC 126 determines if an EDDP PDU is available. If not, then the process simply moves to step S1868. If a PDU is available, then in block S1864, EERNIC 126 receives the frame carrying the Acknowledgement PDU.

EERNIC 126 checks the frame's and EDDP's CRC in block S1866. If the CRC is invalid, then the frame with the EDDP PDU is discarded in block S1868. If the CRC is valid, then EERNIC 126 scans the send timer list 124A in S1870, and determines if the received message matches with the sent message (in step S1872). If there is no match, the process ends in block S1874. If there is a match, then EERNIC 126 notifies host 116 that the Send message has been completed in step S1876. Host 116 processes the message in block S1878 and the process ends in block S1880.

Figure 19:
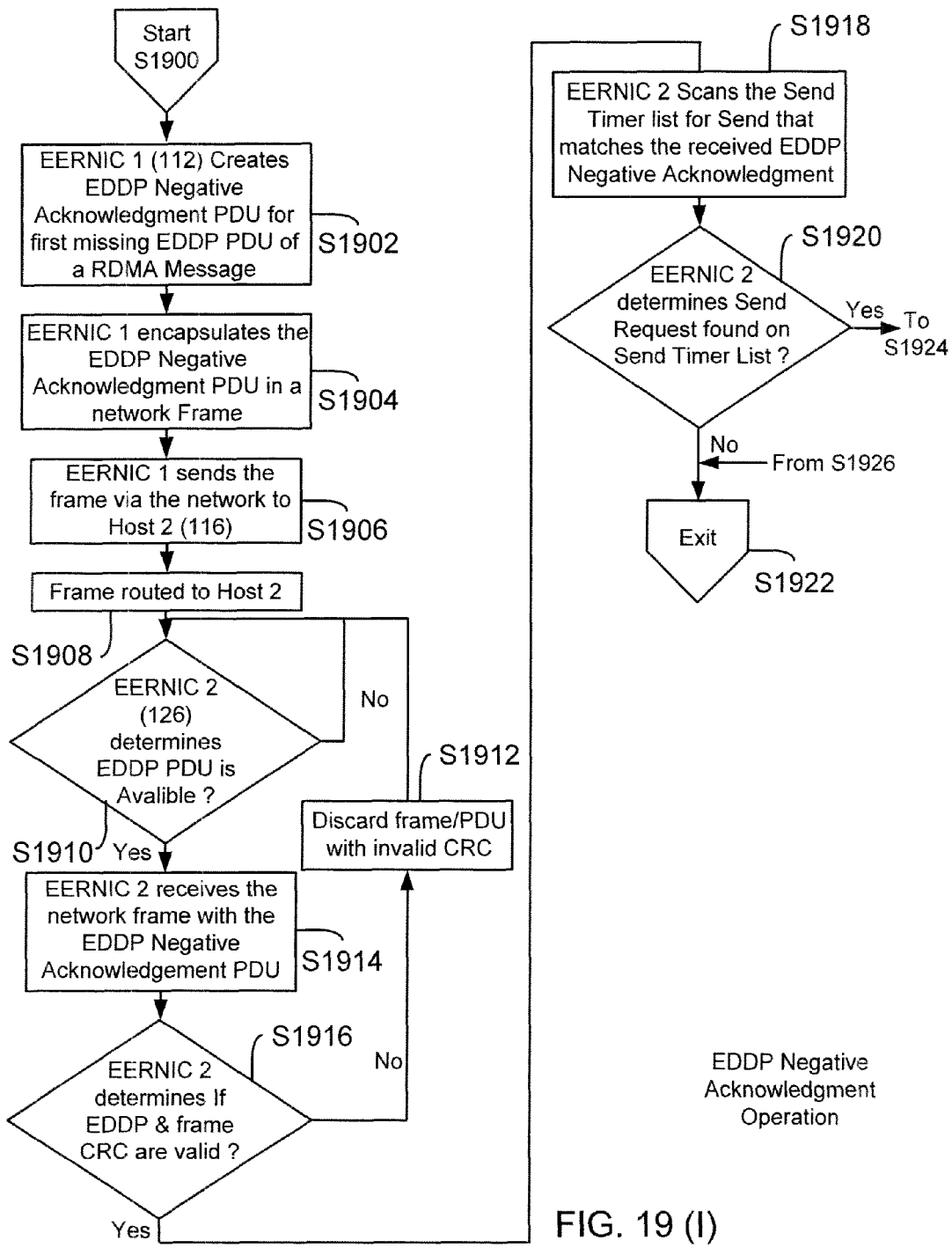
FIG. 19 shows a process flow for sending a NACK PDU from one host to another host.

Negative Acknowledgement (NACK) Process Flow:

FIG. 19 shows a process flow for sending a NACK from host 102 to 116. In block S1902, EERNIC 112 creates an EDDP NACK PDU (FIG. 12 or 13). The PDU is encapsulated in block S1904 and the encapsulated PDU is sent in block S1906. The frame is routed in block S1908 to host 116.

In block S1910, EERNIC 126 determines if an EDDP PDU is available. If unavailable, the EERNIC 126 simply waits. If one is available, then in block S1914, EERNIC 126 receives a network frame with the NACK PDU. In block S1916, EERNIC 126 checks for the EDDP and network frame's CRC. If the CRC is invalid, the frame with the PDU is discarded in block S1912.

If the CRC is valid, then in block S1918, EERNIC 126 scans the Send Timer list 124A and in block S1920 determines if the Send request can be found on the send timer list 124A. If not found, the process ends in block S1922. If found, then EERNIC 126 decrements (i.e. reduces) a RDMA message retry counter in step S1924 (Not shown). The counter is maintained to keep track of how many times a message has been sent.

In block S1926, EERNIC 126 determines if the retry counter is equal to zero. If yes, the process moves to block S1922. If not, then in block S1928, EERNIC 126 creates an EDDP PDU to complete RDMA message indicated by the NACK PDDP. The message is encapsulated in block S1930 and sent in block S1932. The frame is routed to host 102 in block S1934.

In block S1936, the process determines if the RMDA message is for a RDMA write operation. If yes, then the process moves to FIG. 1500. If not, then the process determines if the message if for a RDMA read response. If yes, then the process moves to block S1752 (FIG. 17). If not for a read response, the process moves to block S1828 (FIG. 18).

Figure 20:
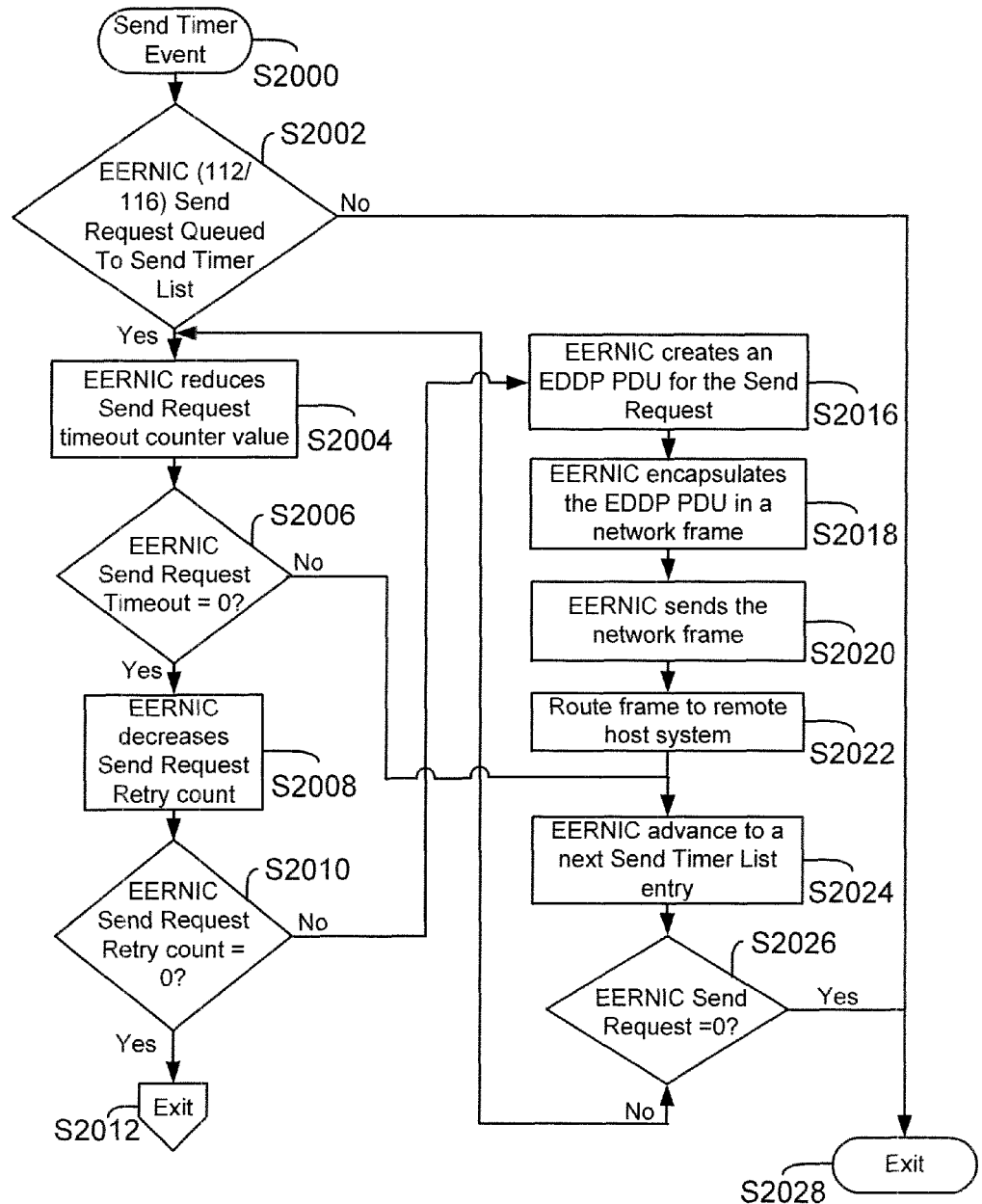
FIG. 20 shows a process flow diagram for managing a send timer event, according to one embodiment.

RDMA Send Timer Event Processing:

FIG. 20 shows a process flow diagram for managing send timer event, according to one embodiment. The process begins in block S2000. In block S2002, the process determines if an EERNIC (for example, 112 and/or 126) has queued a send request to a send timer list (for example, 210A for 112 and 124A for 126). If not, the process ends in block S2028. If yes, then the EERNIC decrements a Send request timer in step S2004 (not shown). In block S2006, the process determines if the timer has timeout (or expired). If not, the process moves to block S2024, described below.

If the timer has expired, then in block S2008 the EERNIC decreases a Send Request Retry counter (not shown) that is maintained for managing "retries". In block S2010, the EERNIC determines if the Send Request retry count is zero. If yes, then the process ends in block S2012.

If in block S2010, the retry count is not zero, then in block S2016, the EERNIC creates an EDDP PDU for the Send request. The PDU is encapsulated in block S2018 and sent out as a network frame (for example, an Ethernet frame) in block S2020. The frame is routed to a remote system in block s2022 and the EERNIC advances to the next entry in block S2024. In block S2026, the EERNIC determines if all Send requests have been handled. If not, the process moves back to block S2016, otherwise, the process ends in block S2028.

Although the present disclosure has been described with reference to specific embodiments, these embodiments are illustrative only and not limiting. Many other applications and embodiments of the present disclosure will be apparent in light of this disclosure and the following claims.

What is claimed is:

1. A method for writing information to a first memory location controlled by a first computing system from a second memory location controlled by a second computing system that interfaces with the first computing system via a network connection, comprising:
   (a) registering the first memory location with a first adapter interfacing with the first computing system;
   (b) providing a first identifier for uniquely identifying the first memory location; wherein the first adapter provides the first identifier to the first computing system;
   (c) notifying the second computing system of the first memory location by using the first identifier with a write request for writing information from the second memory location directly to the first memory location;
   (d) registering the second memory location with a second adapter interfacing with the second computing system;
   (e) providing a second identifier for uniquely identifying the second memory location; wherein the second adapter provides the second identifier to the second computing system;
   (f) creating a tagged protocol data unit ("PDU") for transferring information directly from the second memory location to the first memory location;
   wherein the tagged PDU is created by the second adapter and includes an identifier for identifying the first computing system; the first identifier identifying the first memory location and an offset value that indicates a starting position in the first memory location where information from the second memory location is directly placed by the first adapter;
   (g) encapsulating the tagged PDU into a network frame; wherein the second adapter encapsulates the tagged PDU into the network frame;
   (h) sending the tagged PDU to the first adapter that places payload information of the tagged PDU directly to the first memory location; and
   (i) sending an acknowledgement PDU to the second computing system, if all messages for the write request have been received; wherein the first adapter sends the acknowledgement PDU to the second adapter via the network connection.

2. The method of claim 1, wherein the network frame is an Ethernet frame.

3. The method of claim 1, wherein the information from the second memory location is written without using transmission control protocol (TCP)/Internet Protocol (IP).

4. The method of claim 1, wherein the second adapter maintains a list with entries for all write requests that are received by the second adapter.

5. The method of claim 4, wherein the second adapter clears an entry associated with the write request once the acknowledgement PDU is received from the first computing system.

6. The method of claim 1, wherein before transferring the payload to the first memory location, the first adapter verifies if a frame cyclic redundancy code ("CRC") and a PDU CRC are valid before processing the tagged PDU.

7. The method of claim 6, wherein if the frame CRC and PDU CRC are valid, the first adapter verifies if the network connection, the identifier for the first memory location and the offset are valid.

8. The method of claim 1, wherein if the first adapter determines that all messages regarding the write request have not been received, the first adapter sends a non-acknowledgement packet to the second computing system.

9. The method of claim 1, wherein the tagged PDU conforms to the Ethernet Direct Data Placement (EDDP) protocol that is layered below a Remote Direct Memory Access (RDMA) protocol and above a Data Center Bridging Ethernet protocol.

10. The method of claim 9, wherein the network frame with the tagged PDU sent by the second adapter to the first computing system includes an EDDP header, a RDMA header and an Ethernet header.

11. A method for writing information to a first memory location controlled by a first computing system from a second memory location controlled by a second computing system that interfaces with the first computing system via a network connection, comprising:
   (a) registering the first memory location with a first adapter interfacing with the first computing system;
   (b) providing a first identifier for uniquely identifying the first memory location; wherein the first adapter provides the first identifier to the first computing system;
   (c) notifying the second computing system of the first memory location by using the first identifier with a write request for writing information from the second memory location directly to the first memory location;
   (d) registering the second memory location with a second adapter interfacing with the second computing system;
   (e) providing a second identifier for uniquely identifying the second memory location; wherein the second adapter provides the second identifier to the second computing system;
   (f) creating a tagged protocol data unit ("PDU) for transferring information directly from the second memory location to the first memory location;
   wherein the tagged PDU is created by the second adapter and includes an identifier for identifying the first computing system; the first identifier identifying the first memory location and an offset value that indicates a starting position in the first memory location where information from the second memory location is directly placed by the first adapter;

(g) encapsulating the tagged PDU into a network frame; wherein the second adapter encapsulates the tagged PDU into the network frame;

(h) sending the tagged PDU to the first adapter that places payload information of the tagged PDU directly to the first memory location;

wherein before transferring the payload to the first memory location, the first adapter verifies if a frame cyclic redundancy code ("CRC") and a PDU CRC are valid before processing the tagged PDU and if the frame CRC and PDU CRC are valid, the first adapter verifies if the network connection, the identifier for the first memory location and the offset are valid (i) sending an acknowledgement PDU to the second computing system, if all messages for the write request have been received;

wherein the first adapter sends the acknowledgement PDU to the second adapter via the network connection; and if the first adapter determines that all messages regarding the write request have not been received, the first adapter sends a non-acknowledgement packet to the second computing system.

12. The method of claim 11, wherein the network frame is an Ethernet frame.

13. The method of claim 11, wherein the information from the second memory location is written to the first memory location without using transmission control protocol (TCP)/Internet Protocol (IP).

14. The method of claim 11, wherein the second adapter maintains a list with entries for all write requests that are received by the second adapter.

15. The method of claim 14, wherein the second adapter clears an entry associated with the write request once the acknowledgement PDU is received from the first computing system.

16. The method of claim 11, wherein the tagged PDU conforms to the Ethernet Direct Data Placement (EDDP) protocol that is layered below a Remote Direct Memory Access (RDMA) protocol and above a Data Center Bridging Ethernet protocol.

17. The method of claim 11, wherein the network frame with the tagged PDU sent by the second adapter to the first computing system includes an EDDP header, a RDMA header and an Ethernet header.

18. A system for network communication, comprising:
a first computing system having a first memory location and a first adapter for communicating via a network connection with a second computing system having a second memory location and a second adapter;
wherein information from the second memory location is written directly to the first memory location in response to a write request;
wherein the first adapter is configured to register the first memory location, provide a first identifier to the first computing system for uniquely identifying the first memory location; and notify the second computing system of the first memory location using the first identifier;
wherein the second adapter is configured to register the second memory location; provide a second identifier for uniquely identifying the second memory location; in response to the write request, create a tagged protocol data unit ("PDU) for transferring information directly from the second memory location to the first memory location; encapsulate the tagged PDU into a network frame; and send the tagged PDU to the first adapter;
wherein the tagged PDU includes an identifier for identifying the first computing system; the first identifier identifying the first memory location and an offset value that indicates a starting position in the first memory location where information from the second memory location is directly placed by the first adapter;
wherein before transferring a payload from the Tagged PDU to the first memory location, the first adapter verifies if a frame cyclic redundancy code ("CRC") and a PDU CRC are valid before processing the tagged PDU and if the frame CRC and PDU CRC are valid, the first adapter verifies if the network connection, the identifier for the first memory location and the offset are valid; and
wherein the first adapter sends an acknowledgement PDU to the second computing system, if all messages for the write request have been received; and if the first adapter determines that all messages regarding the write request have not been received, the first adapter sends a non-acknowledgement packet to the second computing system.

19. The system of claim 18, wherein the network frame is an Ethernet frame.

20. The system of claim 18, wherein the information from the second memory location is written to the first memory location without using transmission control protocol (TCP)/Internet Protocol (IP).

21. The system of claim 18, wherein the second adapter maintains a list with entries for all write requests that are received by the second adapter.

22. The system of claim 18, wherein the second adapter clears an entry associated with the write request once the acknowledgement PDU is received from the first computing system.

23. The system of claim 18, wherein the tagged PDU conforms to the Ethernet Direct Data Placement (EDDP) protocol that is layered below a Remote Direct Memory Access (RDMA) protocol and above a Data Center Bridging Ethernet protocol.

24. The system of claim 18, wherein the network frame with the tagged PDU sent by the second adapter to the first computing system includes an EDDP header, a RDMA header and an Ethernet header.

* * * * *

UNITED STATES PATENT AND TRADEMARK OFFICE
CERTIFICATE OF CORRECTION

PATENT NO.        : 8,296,386 B1
APPLICATION NO.   : 12/489241
DATED             : October 23, 2012
INVENTOR(S)       : Charles Micalizzi, Jr.

Page 1 of 1

It is certified that error appears in the above-identified patent and that said Letters Patent is hereby corrected as shown below:

In the Specification

In column 3, line 53, after "diagram" insert -- for --.

In column 5, line 43, delete "126)" and insert -- 112 (or 126) --, therefor.

In column 6, line 27, after "have" insert -- to --.

In column 6, line 67, delete "2^2-1" and insert -- 2^32-1 --, therefor.

In column 7, line 11, after "into" insert -- a --.

In column 8, line 16, delete "control" and insert -- Control --, therefor.

In column 8, line 16, after "placement" insert -- of --.

In column 13, line 27, after "diagram" insert -- for --.

In column 16, line 47, delete "BODE" and insert -- EDDP --, therefor.

Signed and Sealed this
Eighteenth Day of March, 2014

Michelle K. Lee
*Deputy Director of the United States Patent and Trademark Office*